(12) United States Patent
Guo

(10) Patent No.: US 9,762,373 B2
(45) Date of Patent: *Sep. 12, 2017

(54) RESOURCE MANAGEMENT METHOD AND SYSTEM THEREOF

(71) Applicant: SONY CORPORATION, Tokyo (JP)

(72) Inventor: Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,553

(22) Filed: Jul. 27, 2016

(65) Prior Publication Data

US 2017/0026160 A1    Jan. 26, 2017

Related U.S. Application Data

(63) Continuation of application No. 14/806,005, filed on Jul. 22, 2015, now Pat. No. 9,419,773, which is a
(Continued)

(30) Foreign Application Priority Data

Nov. 17, 2009    (CN) .......................... 2009 1 0224762

(51) Int. Cl.
   *H04W 72/04*    (2009.01)
   *H04L 5/00*    (2006.01)
   (Continued)

(52) U.S. Cl.
   CPC .......... *H04L 5/0096* (2013.01); *H04W 16/14* (2013.01); *H04W 16/22* (2013.01); *H04W 72/04* (2013.01);
   (Continued)

(58) Field of Classification Search
   CPC ............................. H04W 72/04; H04W 72/12
   (Continued)

(56) References Cited

U.S. PATENT DOCUMENTS 7,088,920 B2    8/2006    Krishnaswamy et al.
8,804,671 B2*   8/2014    Zhuang ................ H04L 1/0015
                                                        370/252
(Continued)

FOREIGN PATENT DOCUMENTS

CN    101141771    3/2008
CN    101197026    6/2008
(Continued)

OTHER PUBLICATIONS

International Search Report Issued Feb. 24, 2011 in PCT/CN10/78767 filed Nov. 16, 2010.

*Primary Examiner* — John J Lee
(74) *Attorney, Agent, or Firm* — Oblon, McClelland, Maier & Neustadt, L.L.P.

(57) ABSTRACT

The present invention provides a resource management method and system thereof. The resource management method includes: judging whether the variation degree of work state of a communication system will result in the change of resource management information of the communication system or not, if so, then the resource management information is re-collected, wherein the resource management information includes the state, the interference state among links and service stream information relating to each node in the communication system; and determining the resource allocation strategy of the communication system according to the resource management information.

9 Claims, 19 Drawing Sheets

Related U.S. Application Data continuation of application No. 14/062,640, filed on Oct. 24, 2013, now Pat. No. 9,130,732, which is a continuation of application No. 13/509,137, filed as application No. PCT/CN2010/078767 on Nov. 16, 2010, now Pat. No. 9,654,275.

(51) Int. Cl.
 *H04W 16/22* (2009.01)
 *H04W 72/08* (2009.01)
 *H04W 16/14* (2009.01)

(52) U.S. Cl.
 CPC ..... *H04W 72/0486* (2013.01); *H04W 72/082* (2013.01)

(58) Field of Classification Search
 USPC .......... 455/509, 452.1, 67.11, 500, 512, 501, 455/67.13
 See application file for complete search history.

(56) References Cited

U.S. PATENT DOCUMENTS

| | | | |
|---|---|---|---|
| 2004/0077350 A1* | 4/2004 | Naghian | H04W 36/18 455/440 |
| 2006/0190944 A1 | 8/2006 | Moon et al. | |
| 2007/0287464 A1 | 12/2007 | Hamamoto et al. | |
| 2009/0304110 A1* | 12/2009 | Choi | H04L 27/00 375/299 |
| 2010/0229171 A1 | 9/2010 | Yoshimura et al. | |
| 2011/0047271 A1 | 2/2011 | Guibe et al. | |

FOREIGN PATENT DOCUMENTS

| | | |
|---|---|---|
| CN | 101227248 | 7/2008 |
| CN | 101500022 | 8/2009 |
| JP | 2009-049904 A | 3/2009 |
| JP | 2009-534972 A | 9/2009 |
| JP | 2009-246874 A | 10/2009 |
| WO | WO2005/086516 A1 | 9/2005 |

* cited by examiner

RESOURCE MANAGEMENT METHOD AND SYSTEM THEREOF

CROSS-REFERENCE TO RELATED APPLICATIONS

This application is a continuation of U.S. application Ser. No. 14/806,005, filed Jul. 22, 2015, which is continuation of U.S. application Ser. No. 14/062,640 (now U.S. Pat. No. 9,130,732), filed Oct. 24, 2013, which is a continuation of U.S. application Ser. No. 13/509,137, filed May 10, 2012, which is a National Stage Application of PCT/CN2010/078767, filed Nov. 16, 2010, and is further based upon, and claims the benefit of priority from Chinese Patent Application No. 200910224762.9, filed Nov. 17, 2009, the entirety of each of which are incorporated by reference herein.

FIELD

The disclosure relates to communication field, and particularly, to a resource management method and system in a communication system.

BACKGROUND

Resource management and sharing in communication system are attracting much attention. The so called resources may include the time domain resources, the frequency domain resources, and the code domain resources and the like in the communication system. In the conventional, stationary spectrum resource allocation and utilization rules proposed by the organizations such as Federal Communications Commission (FCC), spectrum resources are divided into multiple frequency bands which are allocated to the operators exclusively. This makes the utilization rate of the spectrum resources very low.

Open Spectrum Access (OSA) is proposed to solve the issue of low utilization rate of the stationary spectrum resource. In an open spectrum access system, an unlicensed user may use the idle resources in the frequency band to transmit data in the case that it does not affect the licensed users, thereby improving the utilization rate of the spectrum resource.

The patent application publication No. CN101141771A provides a radio resource management system and method for realizing spectrum sharing. The resource management system disclosed in this application is centralized, and includes: an co-operation control unit for determining a spectrum sharing and processing policy based on a spectrum sharing request of an access network and/or statistic information of the operation of the access networks and the utilization of spectrum; an access network spectrum sharing control unit which is connected with the co-operation control unit and is for coordinating the local radio resource management of different access networks based on the spectrum sharing and processing policy determined by the co-operation control unit so that the access networks share the spectrum resources. The application provides a method for sharing spectrum between different radio access technologies and radio access networks.

SUMMARY

The following presents a simplified summary of the disclosure in order to provide a basic understanding of some aspects of the disclosure. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

According to an aspect of the disclosure, there is provided a resource management method in a communication system. The resource management method may include: judging whether a operating status variation of the communication system causes resource management information of the communication system to change, and if yes, re-collecting the resource management information, wherein the resource management information comprises information regarding statuses of nodes, interference statuses between links and traffic flows in the communication system; and determining a resource allocation policy for the communication system according to the resource management information.

According to another aspect of the disclosure, there is provided a resource management system in a communication system. The resource management system may include: a status query apparatus, an information collecting apparatus and an allocation policy deciding apparatus, and wherein the status query apparatus is configured to judge whether a operating status variation of the communication system causes resource management information of the communication system to change, and if yes, instruct the information collecting apparatus to re-collect the resource management information; the information collecting apparatus is configured to re-collect the resource management information according to an instruction from the status query apparatus, wherein the resource management information comprises information regarding statues of nodes, interference statues between links and traffic flows in the communication system; and the allocation policy deciding apparatus is configured to determine a resource allocation policy for the communication system according to the resource management information.

According to another aspect of the disclosure, there is provided a method of determining a resource allocation policy of a communication system according to the resource management information of the communication system. The method may include: establishing a quantized relation between the resource management information of the communication system and the resource allocation target; determining the resource allocation policy according to the established quantized relation. According to an embodiment, the step of establishing the quantized relation between the resource management information and the resource allocation target includes: establishing a resource allocation model according to the resource management information, wherein the resource allocation model reflects neighborhood relations between the links, mutual exclusion relations between the links, and bandwidth requirement and priority level of each link in the communication system; and establishing a constrained condition for resource allocation according to the resource allocation model, and quantizing the resource allocation target. According to an embodiment, the step of determining the resource allocation policy according to the established quantized relation includes: arranging an order for links in the resource allocation model, and selecting links that can be allocated with resources simultaneously therein; and allocating resources for each of the selected links according to the constrained condition for resource allocation and the quantized resource allocation target.

According to another aspect of the disclosure, there is provided a method of determining a resource allocation mechanism in a communication system. The method may include: performing a statistic of traffic load of the communication system; and selecting a resource allocation mechanism for implementing the resource allocation policy according to the traffic load. According to an embodiment, the step of selecting the resource allocation mechanism for implementing the resource allocation policy according to the traffic load includes: judging whether the communication system is in a light-load status or a heavy-load status according to the traffic load; and in the case of the light-load status, selecting a centralized resource allocation mechanism as the resource allocation mechanism, and in the case of the heavy-load status, selecting a distributed resource allocation mechanism as the resource allocation mechanism. In the centralized resource allocation mechanism resources of the communication system are allocated centrally by a main control node of the communication system; and in the distributed resource allocation mechanism multiple nodes of the communication system serve as regional decision-making nodes, each of which allocates resources of a region, where the regional decision-making node is located, in entire coverage of the communication system.

According to an aspect of the disclosure, there is provided an allocation policy deciding apparatus of determining the resource allocation policy in the communication system. The apparatus includes: an information transforming unit configured to establish a quantized relation between the resource management information and a resource allocation target; and a determining unit configured to determine the resource allocation policy according to the established quantized relation. According to an embodiment, the information transforming unit is configured to establish a resource allocation model according to the resource management information, wherein the resource allocation model reflects neighborhood relations between the links, mutual exclusion relations between the links, and bandwidth requirement and priority level of each link in the communication system; and establish a constrained condition for resource allocation according to the resource allocation model, and quantize the resource allocation target. According to an embodiment, the determining unit is further configured to arrange an order for links in the resource allocation model, and select links that can be allocated with resources simultaneously therein; and allocate resources for each of the selected links according to the constrained condition for resource allocation and the quantized resource allocation target.

According to another aspect of the disclosure, there is provided an allocation mechanism controlling apparatus for determining the resource allocation mechanism in the communication system. The allocation mechanism controlling apparatus includes a statistic unit and a selecting unit. The statistic unit is configured to perform a statistic of traffic load of the communication system; and the selecting unit is configured to select a resource allocation mechanism for implementing the resource allocation policy according to the traffic load. According to an embodiment, the selecting unit is further configured to judge whether the communication system is in a light-load status or a heavy-load status according to the traffic load; and in the case of the light-load status, select a centralized resource allocation mechanism as the resource allocation mechanism, and in the case of the heavy-load status, select a distributed resource allocation mechanism as the resource allocation mechanism. In the centralized resource allocation mechanism resources of the communication system are allocated centrally by a main control node of the communication system; and in the distributed resource allocation mechanism multiple nodes of the communication system serve as regional decision-making nodes, each of which allocates resources of a region, where the regional decision-making node is located, in entire coverage of the communication system In addition, some embodiments of the disclosure further provide computer program for realizing the above method.

Further, some embodiments of the disclosure further provide computer program products in at least the form of computer-readable medium, upon which computer program codes for realizing the above method are recorded.

BRIEF DESCRIPTION OF DRAWINGS

The above and other objects, features and advantages of the embodiments of the disclosure can be better understood with reference to the description given below in conjunction with the accompanying drawings, throughout which identical or like components are denoted by identical or like reference signs. In addition the components shown in the drawings are merely to illustrate the principle of the disclosure. In the drawings.

DETAILED DESCRIPTION

Some embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that some details regarding some components and/or processes irrelevant to the disclosure or well known in the art are omitted for the sake of clarity and conciseness.

Some embodiments of the disclosure provide methods, apparatuses and systems for resource sharing and management in a communication system to ensure the effective utilization of the system resources, such as spectrum resources. The so called resources may include the time domain resources, the frequency domain resources, the code domain resources or any combination thereof.

Figure 1:
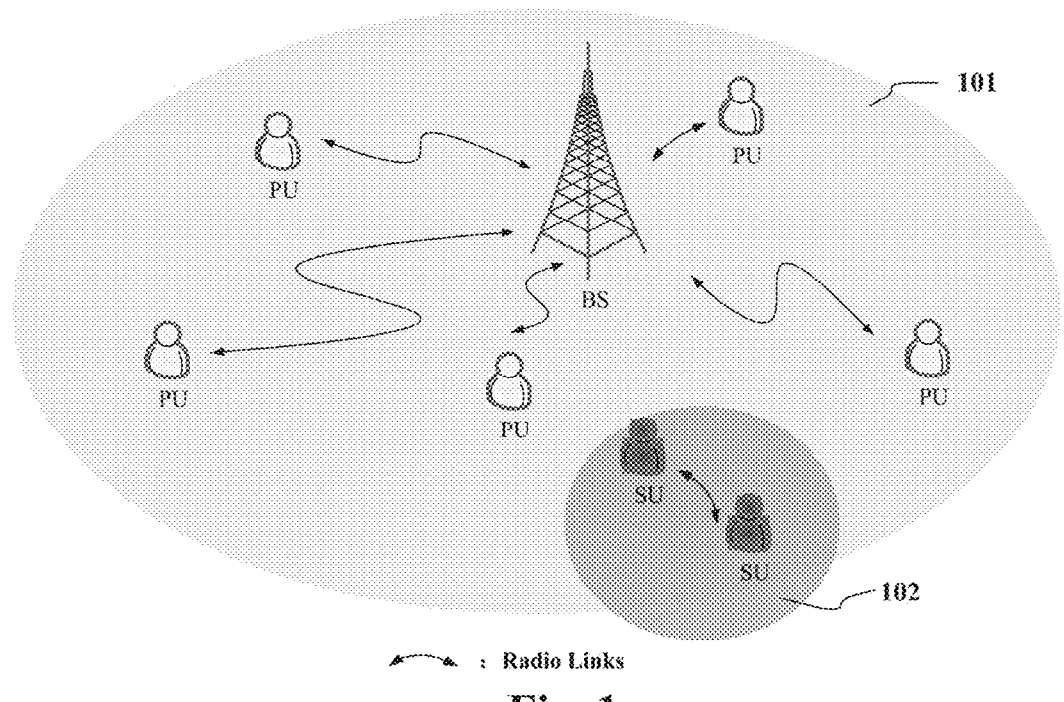
FIG. 1 is a schematic diagram illustrating an example of a scenario to which the embodiments of the disclosure may be applied.
Figure 2:
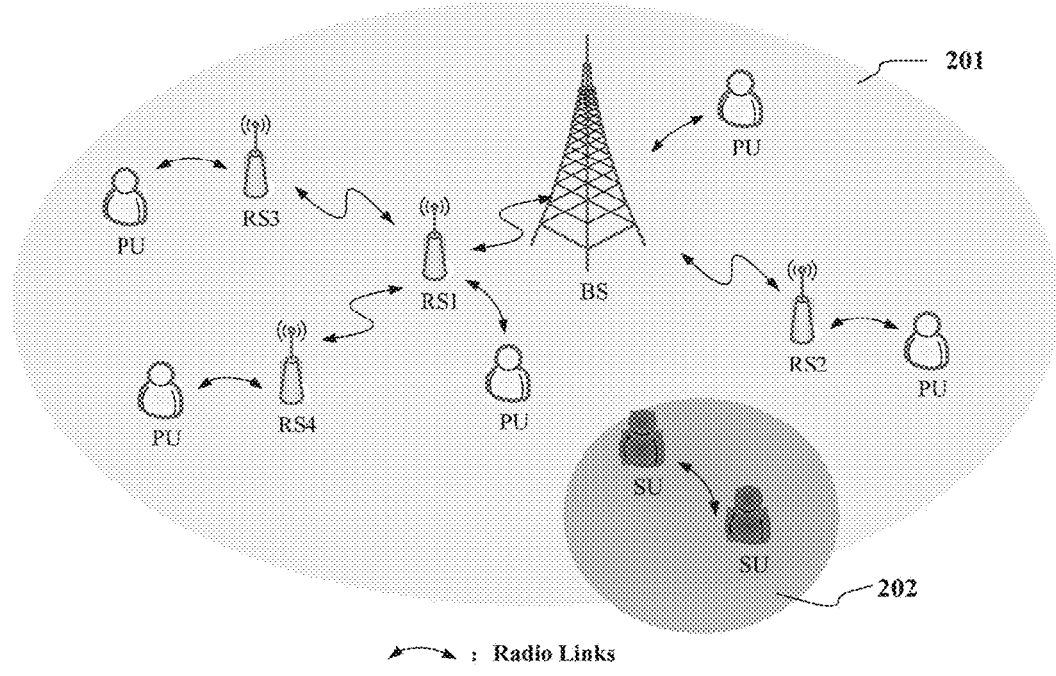
FIG. 2 is a schematic diagram illustrating another example of a scenario to which the embodiments of the disclosure may be applied the embodiments of the disclosure.

The method and system according to embodiments of the disclosure may be applied to any communication system having the features of open spectrum access. FIG. 1 and FIG. 2 show examples of such communication systems.

FIG. 1 shows an example of a communication system to which the method and apparatus of the embodiments of the disclosure may be applied. The communication system shown in FIG. 1 is of open spectrum access and includes two types of network system; the first type is a primary system network 101. The primary system network 101 owns absolute priority of utilizing the operation frequency band thereof. The user of this system is called as Primary User (PU). The second type is the Secondary System network 102, which covers a part or whole of the region covered by primary system. The user of the secondary system network is called as Secondary User (SU). When the secondary system 102 and the primary system 101 simultaneously utilize the same radio resources, the primary system 101 will be interfered. Therefore, the rule of resource sharing in the open spectrum access system may include the following: the secondary system 102 is allowed to use the idle resources among the resources such as the frequency band in the primary system 101 for data transmission only when the primary system 101 is not interfered. The primary system 101 includes two types of nodes: i.e. Base Station (BS) and primary user (PU). A base station is connected to a backbone network, and provides service of accessing the core network for the primary users. The secondary system 102 may be any type of communication system, such as: a self-organizing network (Ad Hoc) including secondary users, a Mesh Network including routers and secondary users, or a local area network including Access Points (AP) and secondary uses, or any appropriate communication system, and the disclosure should not be limited to any of the examples. In addition, in the communication system may further include one or more secondary systems. In the embodiments of the disclosure the number, type and scale of the secondary systems are not limited. In other words, one or more secondary systems 102 of different types and different scales may co-exist within the scope affecting the primary system 101.

FIG. 2 shows another example of a communication system to which the method and apparatus of the embodiments of the disclosure can be applied. The communication system shown in FIG. 2 is also of open spectrum access and includes a primary system and a secondary system. Different from the primary system in FIG. 1, the primary system 201 shown in FIG. 2 is a relay network, such as Multihop Wireless Relay Network. As shown in FIG. 2, the relay network 201 includes 3 types of nodes, i.e. base station, relay station (RS) and primary user. The base station is connected to a backbone network, and provides service of accessing the core network for the primary users. The relay station may include one or more stages for forwarding signals wirelessly between the base station and the primary users. Embodiments of the disclosure may be applied to the open spectrum access system shown in FIG. 2, and the stage number, the number, the locations, and whether to have mobility regarding the relay stations in the primary system are not limited. Similar to the secondary system 102 shown in FIG. 1, the secondary system 202 may also be an Ad Hoc network, a Mesh network, a local area network, or any appropriate network, and the disclosure should not be limited to any of the examples.

FIG. 1 and FIG. 2 show examples of the communication system of open spectrum access, to which the methods, systems, and apparatuses according to embodiments of the disclosure may be applied. It should be noted that the examples are illustrative, rather than exhaustive. The disclosure should not be considered to be limited to the above the communication systems. The methods and apparatuses according to embodiments of the disclosure can also be applied to other communication systems which require dynamic allocation and management of the system resources, the description of which is not detailed herein.

Figure 3:
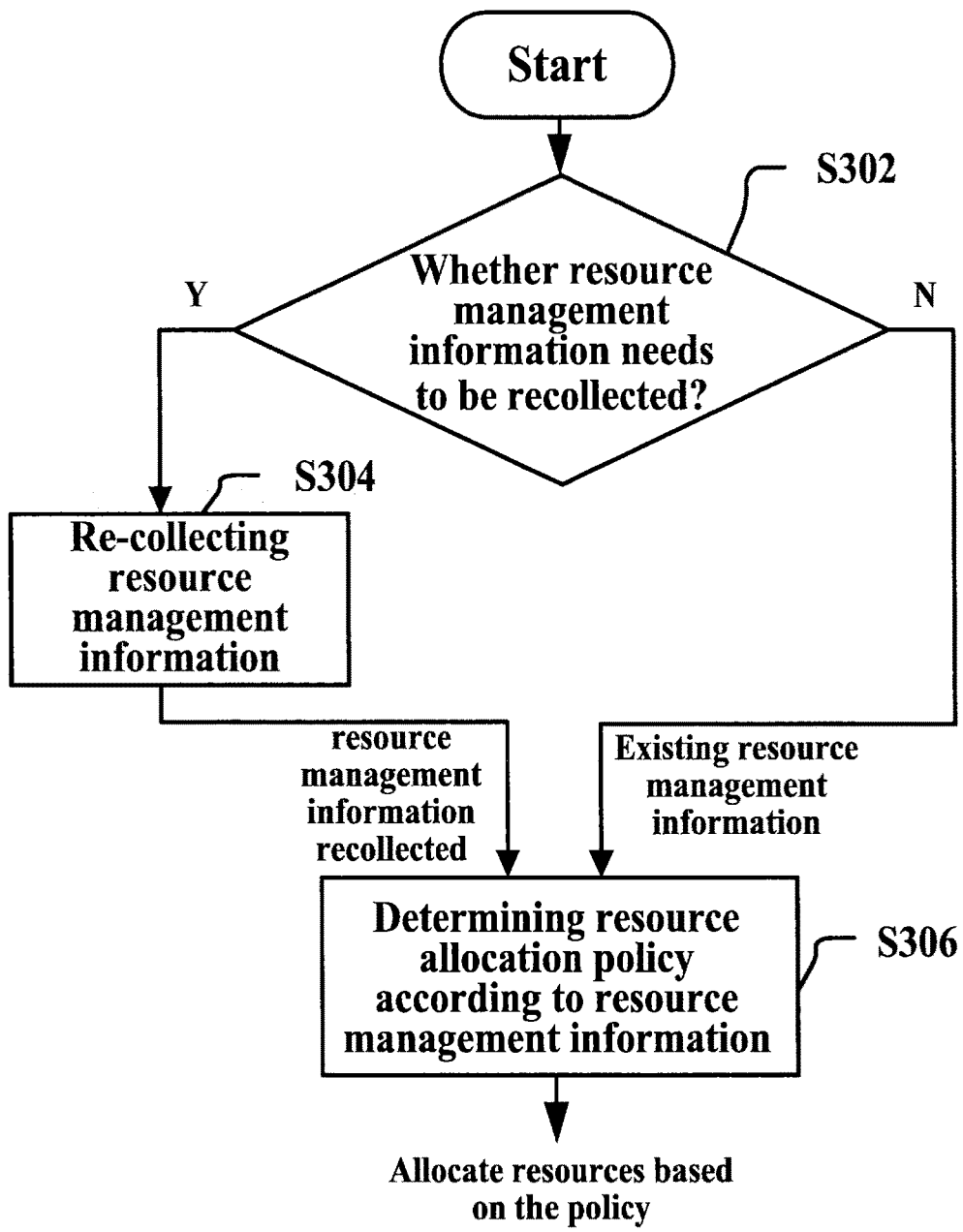
FIG. 3 is a schematic flowchart illustrating the resource management method according to an embodiment of the disclosure.

FIG. 3 illustrates a resource management method in a communication system according to an embodiment of the disclosure.

As shown in FIG. 3, the resource management method may include steps S302, S304 and S306.

system. In this way, the system cost in information collection can be decreased effectively.

As an example, the resource management information may be classified as 3 types: information regarding the basic architecture of the system and statuses thereof (that is, statuses of nodes); information regarding mutual exclusion relation between radio links (that is, interference statuses between links) and information regarding the user traffic flows. In other words, the resource management information may include, but not limited to, information regarding statuses of nodes, interference statuses between links and traffic flows in the communication system.

Table 1 shows an example of resource management information of the communication system shown in FIG. 2. As shown in Table 1, the resource management information of the communication system may include information such as network statuses of the primary system, statuses of the primary user, network statuses of the secondary system and statuses of the secondary user, and the like.

TABLE 1

Example of the resource management information of the communication system

| | Resource Management Information |
|---|---|
| network statuses of primary system | Links connecting BS, RS and statuses of the links; Power consumption control statuses of BS, RS; Moving statuses (moving velocity/direction, etc.) of RS; Working statuses (working/idle/sleeping, etc.) of RS. |
| Statuses of primary user | Identifier (Numbering) of BS, RS directing serving primary user; Moving statuses (moving velocity/direction, etc.) of primary user; Working statuses (working/idle/sleeping, etc.) of primary user; Traffic connection statuses (connection types and QoS parameters, etc.) of primary user. |
| network statuses of secondary system | For Ad Hoc network: number of secondary users and connection statuses of secondary users; For Mesh network: link statuses of backbone network including routers, number of secondary users and connection statuses between secondary users and backbone network, etc.; For local area network: number of users, etc. |
| statuses of secondary user | Moving statuses (moving velocity/direction, etc.) of secondary user; Operating statuses (working/idle/sleeping, etc.) of secondary user; Traffic connection statuses (connection types and QoS parameters, etc.) of secondary user. |

In step S302, it is judged whether an operating status variation of the communication system affects resource management information of the communication system. That is, it is judged that whether the resource management information of the communication system needs to be re-collected according to the degree of the variation of the operation statuses of the communication system. If yes, the resource management information is re-collected in step S304. Otherwise, the resource management information is not re-collected and in this case the previously collected or saved resource management information is employed. In step S306, a resource allocation policy for the communication system is determined according to the resource management information.

The resource management information refers to the information that is capable of affecting the management of resources and the deciding of allocation policy of the communication system.

In the embodiment as shown in FIG. 3, during the collection (e.g. analysis/statistic/measurement) of the information necessary for resource allocation, the policy of information collection may be adapted to fit the degree of variation in the operation statuses of the communication It should be noted that, the resource management information shown in Table 1 is merely illustrative, and the disclosure should not be considered as being limited to this. As can be appreciated by those skilled in the art, the content of the resource management information which affects the resource management and allocation policy may be determined based on the practical application and requirements, the description of which is not detailed herein.

Whether the degree of operating status variation of the communication system affects the information necessary for resource management policy (that is, whether the resource management information needs to be re-collected) may be determined by using various methods. As an example, if the operating status variation of the communication system relates to only a local area, only the resource management information associated with the local area needs to be re-collected, while the resource management information associated with other areas may remain as previously collected or saved information. As another example, if the variation of the communication system relates to only part of working statuses thereof (e.g. interference status between links or statuses of traffic flows), only the information associated with this part of working statuses is re-collected.

For example, the movement of a primary user node will cause the mutual exclusion relation between links connecting the node and other nodes to change, while the traffic flows remain unchanged. In this case, only the information associated with the mutual exclusion relation between related links is re-collected, while the information of traffic flows related to this node may use the previously collected or saved information. For another example, when the traffic flow between a primary user node and other nodes changes while the interference relationship between the links remains unchanged, only the information of the traffic flows associated with the primary user node is re-collected, and it is not necessary to re-collect the information of mutual exclusion relation between links associated with the primary user node.

Figure 4:
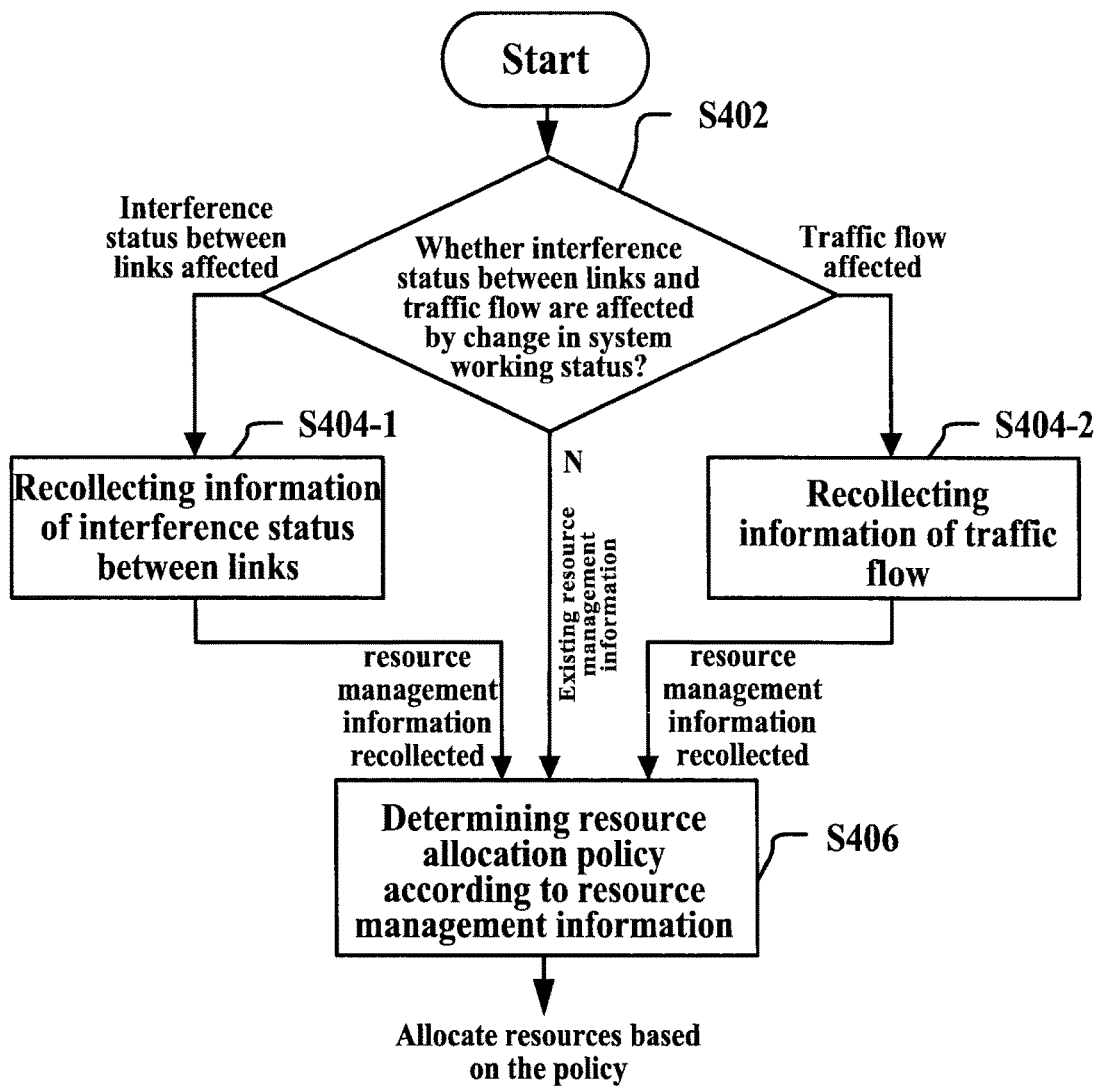
FIG. 4 is a schematic flowchart illustrating the resource management method according to another embodiment of the disclosure.

FIG. 4 shows a schematic flow chart of the resource management method according to another embodiment of the disclosure. The resource management method shown in FIG. 4 includes steps S402, S404-1, S404-2 and S406.

In S402, when the operating statuses of the communication system change, it is judged whether the change affects the interference statuses between links and traffic flows in the communication system.

If the operating status variation of the communication system affects the interference statuses between links in the communication system, it is determined that the information regarding the interference statuses between links needs to be re-collected, and in step S404-1 the information regarding the interference statuses between links is re-collected.

If the operating status variation of the communication system causes the traffic flows of the communication system to change, it is determined that the information regarding the traffic flows needs to be re-collected, and in step S404-2 the information regarding the traffic flows is re-collected.

If the operating status variation of the communication system affects neither the interference statuses between links in the communication system nor the traffic flows of the communication system, it is determined that the system management information needs not to be re-collected. In other words, in this case the resource management information needs not to be re-collected, and the previously collected or saved resource management information may be used.

Step SS406 similar to step S306 shown in FIG. 3, the description of which is not repeated.

Similar to the embodiment shown in FIG. 3, in the embodiment of FIG. 4 the policy of collecting information may be adaptively adjusted according to the degree of operating status variation of the communication system, so that the system cost for information collection may be decreased significantly. Particularly, whether the resource management information needs to be re-collected and which resource management information needs to be re-collected may be determined according to the degree of variation in various operating statuses (e.g. changes in the mutual exclusion relation between links between some nodes and traffic flows of some nodes, and the like) in the areas of the communication system (In the example of FIG. 21 the information regarding the mutual exclusion relation between links is re-collected, or the information regarding traffic flows is recollected, or both are re-collected).

Figure 14:
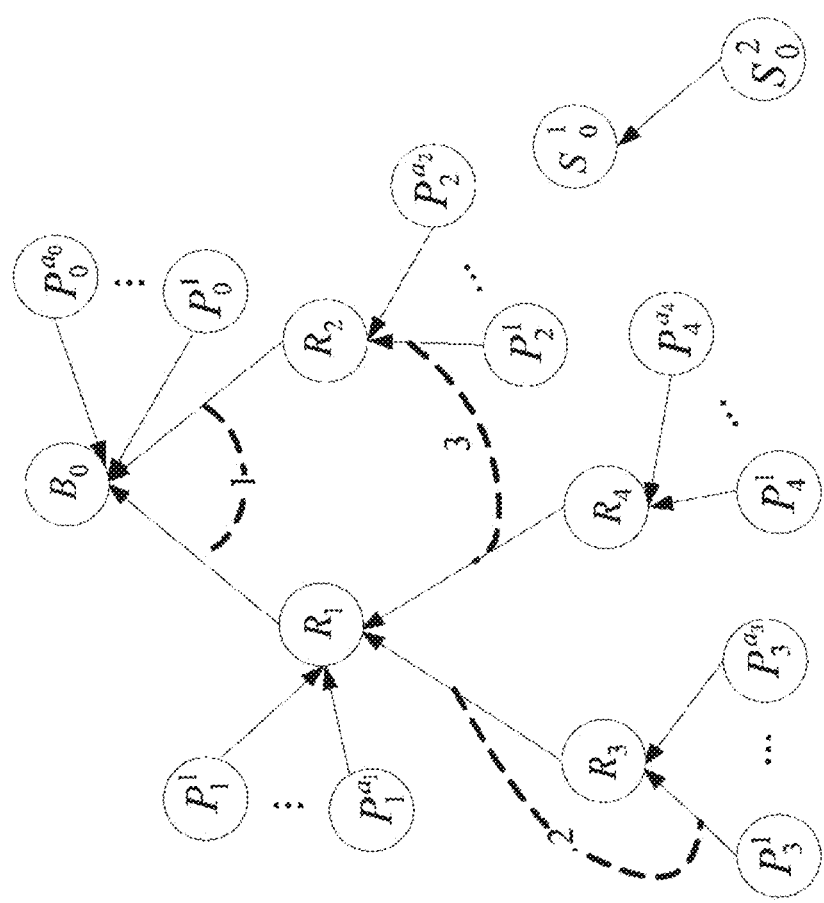
FIG. 14 is a schematic diagram illustrating an information collection object for collecting resource management information for the communication system shown in FIG. 2.

For further illustrating the collection of the resource management information, FIG. 14 shows the object of information collection for the communication system in FIG. 2.

In FIG. 14, symbols B, R, P, and S represent nodes in the communication system, respectively. B, R and P represent the base station, the relay station and the primary user node in the primary system network, respectively; and S represents the secondary user node in the secondary system network. The subscript of the symbol B/P representing base station/relay station node represents the numbering thereof. The subscript of the symbol P representing primary user node denotes the numbering of the base station/relay station directly serving it, and the upper script represents the numbering of this primary user node P among all the primary user nodes that are served directly by the base station/relay station. The subscript of the symbol S representing the secondary user node denotes the numbering of the secondary system to which the secondary user belongs, and the upper script denotes the numbering of this secondary user node S among all the secondary users in the secondary system. The directional solid lines between the nodes represent radio links (for conciseness, only the upper links of the primary system network and links in an arbitrary direction in the secondary system are used as identification). The nodes and the radio links therebetween constitute the basic architecture of the communication system.

The dotted lines in FIG. 14 denote the interference statuses between links, i.e. the mutual exclusion relation between links. Two radio links between which there is mutual exclusion relation (i.e. the links are disjointed) can not simultaneously utilize the same radio resource.

As an example, the mutual exclusion relation between links may be classified as 3 types. In FIG. 14, the 3 types of mutual exclusion relation are denoted by the numerical 1, 2 and 3, respectively. The $1^{st}$ type of mutual exclusion relation means that a node can not simultaneously receive different signals from multiple sources, or can not simultaneously transmit different signals to multiple targets. This restriction does not hold for the nodes configured with multiple antennas. The $2^{nd}$ type of mutual exclusion relation means that a node can not simultaneously receive and transmit. This restriction does not hold for the nodes configured with multiple transceivers. The $3^{1d}$ type of mutual exclusion relation refers to that the co-channel interference exist between two radio links, wherein the co-channel interference phenomenon is due to the overlapping of the coverages of signals while neither the source nodes nor the destination nodes of the two links are the same.

The architecture and link statuses and the like of the primary system network (e.g. the relay network) and various types of secondary system network are established, maintained and managed by the systems themselves. For the detailed process of this, please refer to the related documents, the description of which is not detailed herein. Therefore, the information regarding the architecture and link statuses may be obtained from related devices in the primary system network and the secondary system networks, such as the base station shown in FIG. 1 or FIG. 2, the user in self-organizing network, the router or user in Mesh network, or the access point (AP) in local area network, or the like, the description of which is not detailed herein. Some resource management information, such as the $1^{st}$ and $2^{nd}$ types of mutual exclusion relation to be described below or the like, may be obtained by performing analysis and statistic to the information regarding the architecture and link statuses.

Figure 15:
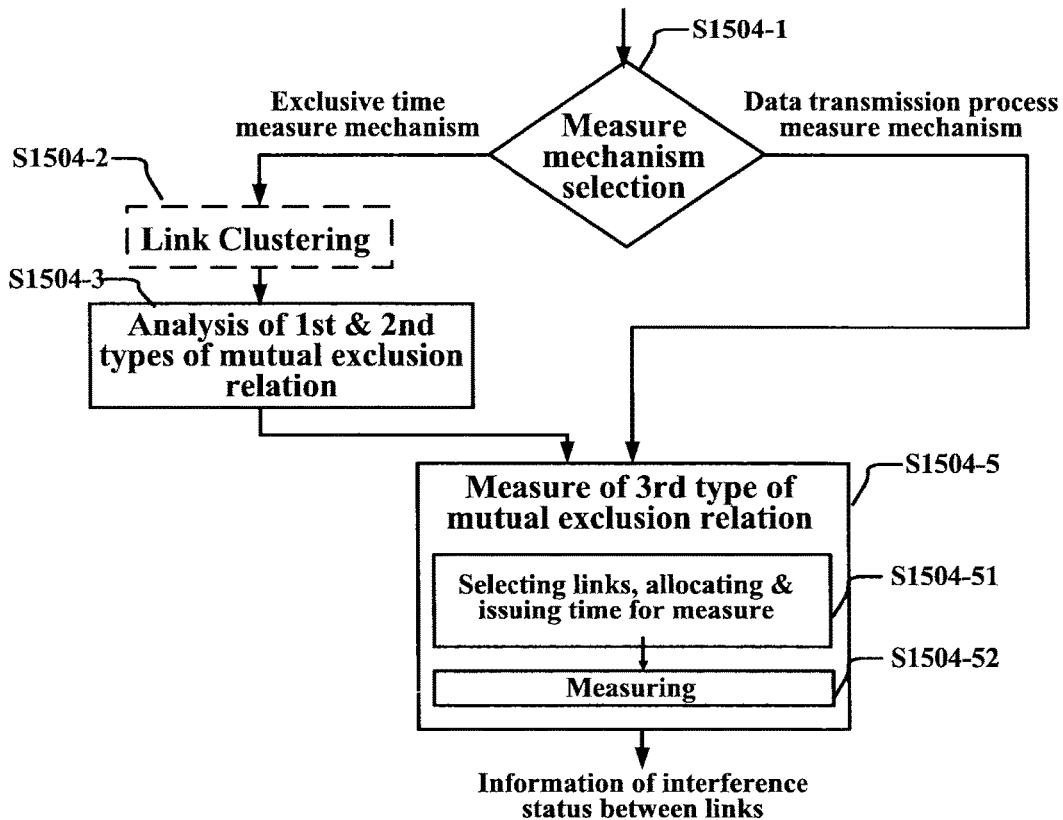
FIG. 15 is a schematic flowchart of collecting the information of interference statuses between links in a communication system.
Figure 16:
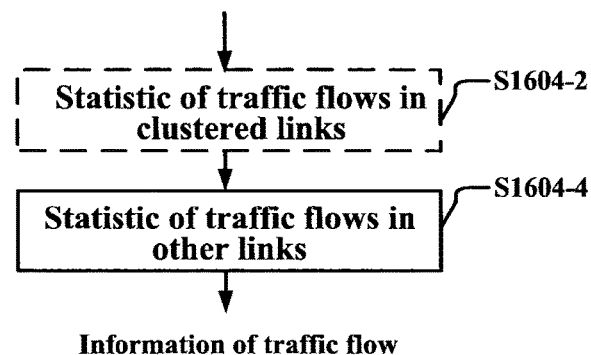
FIG. 16 is a schematic flowchart illustrating a process of collecting the information regarding traffic flows in a communication system.

FIG. 15 and FIG. 16 show examples of the method of collecting the resource management information. FIG. 15 illustrates an example of the method of collecting the information of interference statuses between links.

As shown in FIG. 15, the method may include steps S1504-1, S1504-3 and S1504-5. Optionally, the method may further include step S1504-2.

In step S1504-1, the measurement mechanism is selected according to the degree of variation in the interference statuses between links of the communication system. When the overall architecture of the communication system changes so that most of the links change or when the communication system is established, the exclusive time measurement mechanism may be used. When only a local area in the communication system changes so that only the interference statuses between the links of this area change, the data transmission process measurement mechanism may be used.

In the exclusive time measurement mechanism, the communication system allocates special time for measuring the mutual exclusion relation (i.e. the interference relationship) between links. During this special time, no data transmission is performed.

In the data transmission process measurement mechanism, when the mutual exclusion relation between links in a local area of the communication system changes, the related nodes in the communication system measures, during data transmission, the links via which the data transmission is performed and whose statuses change in the local area. These related nodes may be the nodes whose coverages overlap with that of the links whose statuses change in the local area. For example, one or more idle nodes, other than the nodes in communication, in this local area may be chosen as the related nodes. The data transmission process measurement mechanism may be considered as a supplement to the exclusive time measurement mechanism.

If the exclusive time measurement mechanism is selected, steps S1504-2, S1504-3 and S1504-5 will be executed. If the data transmission process measurement mechanism is chosen, step S1504-5 will be executed.

In step S1504-2, the radio links in the communication system is clustered (also referred to as "clusterized") into one or more link clusters.

Figure 17:
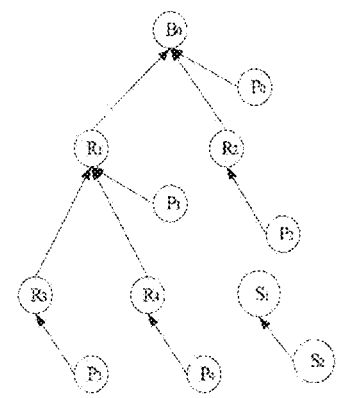
FIG. 17 shows an example of clustering the links in the communication system having the structure shown in FIG. 14.

Generally, there are many nodes (e.g. users) in the communication system and there are a large amount of radio links between the nodes. Clustering the links is to perform a granularity clustering to the objects of mutual exclusion relation measurement. Depending on the distribution and performance requirements of the communication system, the radio links may be clustered by using various polices. In an example in which the primary system network is a relay network, the simplest clustering method is to classify the base station/relay station (BS/RS) and the nodes directly served by them as one cluster, which is also referred to as natural cluster. Then a natural cluster may be further clustered into multiple clusters or multiple natural clusters may be aggregated as one cluster based on the requirements of load equalization and the like. As another example, the area of a cell may be divided equally and the radio links belonging to the same part may be considered as a cluster. Of course, other link clustering method may be used, the description of which is not detailed herein. With the secondary system in the communication system as an example, since the number of the secondary users is generally small, each link may be used as a cluster. And when the number of the secondary users is large, the links may be clustered by using other clustering method based on the practical scenarios, the description of which is not detailed herein. FIG. 17 shows an example of a result of clustering the links in the communication system including the collection objects shown in FIG. 14. In the example, the primary system network of the communication system is a relay network, and the links are clustered by using the natural clustering method; while the links in the secondary system are clustered by using each user link as a cluster. The natural cluster is represented by the link between the base station or the relay station and any of the users directly served by them. As shown in FIG. 17, a user directly served by BS or RS is denoted by a node P having a same subscript. For example, the cluster including B0 and the users directly served by B0 is represented by the link from P0 to B0.

By clustering the links in the communication system, in the following measurement the link cluster may be used as the unit for analysis and measurement of mutual exclusion relation. Further, in the following resource allocation, resources may be firstly allocated in a coarse granularity among the link clusters, and then the resources may be further allocated with a refined granularity among the links in each link cluster. By using the link clustering, the calculation amount of the analysis and measurement of the resource management information may be reduced, and the complexity and the system performance may be balanced effectively during the resource allocation.

Of course, the clustering step S1504-2 is optional.

In addition, when only the operating statuses of a local area in the communication system change, the clustering may be not performed. In this case, step S1504-5 may be executed directly to measure the $3^{rd}$ type of mutual exclusion relation.

In step 1504-3, the $1^{st}$ and $2^{nd}$ types of mutual exclusion relation are analyzed and measured according to the antenna configuration, transceiver configuration and the like of the nodes in the communication system (these information may be obtained from, for example, the main control device of the primary system and the main control device of the secondary system, the description of which is not detailed herein). For example, if a node is provided with a single receiving or transmitting antenna, it can not simultaneously receive different signals from multiple resources or can not transmit different signals to multiple targets, thus there is the 1st type of mutual exclusion relation between the links associated with the node. As shown in FIG. 14, in the case that the node $B_0$ is provided with one transceiver, the node $B_0$ can not simultaneously receive the signals from the relay stations $R_1$ and $R_2$. Therefore, there is the 1st type of mutual exclusion relation between the link $R_1 \rightarrow B_0$ and the link $R_2 \rightarrow B_0$. For another example, the $2^{nd}$ type of mutual exclusion relation represents that a node can not transmit and receive simultaneously, and the relay station node $R_3$ (supposing this node has a single transceiver) in FIG. 14 can not receive the signal from the primary user node $P_3^1$ and transmit a signal to the relay station node $R_1$ at the same time. Therefore, there is the $2^{nd}$ type of mutual exclusion relation between the links $P_3^1 \rightarrow R_3$ and $R_3 \rightarrow R_1$. For conciseness, it is supposed the nodes shown in FIG. 14 each have a single transceiver. It should be noted that, however, this is illustrative merely. The disclosure should not be limited to this. In practice, the nodes (e.g. the base station, the relay station or the mobile station, etc) in the communication system each are provided with multiple transceivers. For example, if the node $B_0$ in FIG. 14 is provided with multiple transceivers, then in the model of FIG. 14 multiple links may be from the node $B_0$. These links may be used in signal transmission between the node $B_0$ and other nodes, without interference to each other. The mutual exclusion relation between these links and other links may be analyzed and measured by using the above method, the description of which is not repeated.

In an example, after the links are clustered (step S1504-2), the 1$^{st}$ and 2$^{nd}$ types of mutual exclusion relation between the clusters may be defined based on the relationship thereof. It may be analyzed and judged on whether there are the 1$^{st}$ and 2$^{nd}$ types of mutual exclusion relation between the link clusters based on the configuration information of antennas and transceivers of the nodes in the clusters, so as to obtain the information regarding the 1$^{st}$ and 2$^{nd}$ types of mutual exclusion relation between the link clusters. In addition, the 1$^{st}$ and 2$^{nd}$ types of mutual exclusion relation between the links in each cluster may be obtained based on the configuration information of antennas and transceivers of the nodes in the cluster.

In another example, in the case that the links are not clustered, it may be analyzed and judged on whether there are the 1$^{st}$ and 2$^{nd}$ types of mutual exclusion relation between the nodes in the communication system based on the configuration information of antennas and transceivers of the nodes, so as to obtain the information regarding the 1$^{st}$ and 2$^{nd}$ types of mutual exclusion relation between the links.

In step 1504-5, the 3rd type of mutual exclusion relation between the links is analyzed and measured based on whether the signal coverages of the links overlap with each other.

If the signal coverages of two links, the source nodes and destination nodes of which are not the same, overlap with each other and thus co-channel interference is possible, it may be determined that there is the 3rd type of mutual exclusion relation between the two links. As shown in FIG. 14, the source nodes and destination nodes of the links $P_2^1 \rightarrow R_2$ and $R_4 \rightarrow R_1$ are different from each other, however since the signal coverages of the two links overlap with each other, there is the 3rd type of mutual exclusion relation between the two links.

As an example, step S1504-5 may include two sub-steps S1504-51 and S1504-52. In step S1504-51, the links to be measured are selected and the measure time slots are allocated and broadcast. If only a local arena in the system statuses changes, only the related links need to be measured. Thus the links to be measured need to be selected according to the change in the local area. Then time slots are allocated for the links and the allocated time slots are notified to the nodes participating in the measurement. As described above, the nodes participating in the measurement may be the related nodes that are possibly affected by the local change, such as one or more idle nodes in the local area related to the change. For example, it is supposed a user node $P_x$ is newly added in the communication system and the relay station directly serving the user node is $R_x$, then a new link between the two nodes is $R_x \leftrightarrow P_x$, and the several relay stations adjacent to $R_x$ and the user nodes served by them may be considered as the potential related nodes that possibly interfere with the new link. When measuring the 3rd type of mutual exclusion relation, the links between the node $P_x$ and these related nodes may be selected as links to be measured. A measure time slot is allocated for $R_x \leftrightarrow P_x$, and when the measure time slot comes, one or more idle nodes of these related nodes may perform the measurement. In step S1504-52, the nodes participating in the measurement perform the measurement in the allocated time slot. Particularly, in the allocated time slot, a signal is transmitted via a link under measurement. If the monitored signal reaches a criterion, for example, if the strength of the monitored signal exceeds a threshold value, it may be determined that the link under measurement interferes with the data of the node, and thus it can be determined that there is the 3rd type of mutual exclusion relation between the link under measurement and the links of the nodes participating the measurement. It should be noted that, the above method of collecting information of the 3rd type of mutual exclusion relation is merely illustrative. The disclosure is not limited to this. Other appropriate method may be used to collect the information as required, the description of which is not detailed herein.

In an example step S1504-1 may be omitted. For example, the exclusive time measurement mechanism may be used as the default measurement mechanism for analyzing and/or measuring the 1$^{st}$, 2$^{nd}$, and 3$^{rd}$ types of mutual exclusion relation in the communication system. For another example, the data transmission process measurement mechanism may be used as the default measurement mechanism for analyzing and/or measuring the 1$^{st}$, 2$^{nd}$, and 3$^{rd}$ types of mutual exclusion relation.

FIG. 16 shows an example of a method of collecting information of traffic flows in the case that the radio links are clustered. As shown in FIG. 16, the method includes steps S1604-2 and S1604-4. In step S1604-2, a statistic of the traffic flows in the clustered links is performed, that is, a statistic of the traffic flows of each link cluster is performed. Particularly, the total bandwidth requirements of each link cluster may be calculated based on the information regarding the bandwidth requirements of the related users (which may be obtained from, for example, the main control node in the primary system and the main control node in the secondary system, the description of which is not detailed herein), so as to obtain the information regarding traffic flows of the link cluster. The sum of the bandwidth requirements of the links in a link cluster is the total bandwidth requirements of the link cluster. In step S1604-4, a statistic of the traffic flows in other links is performed. That is, the bandwidth requirements of the non-clustered links are calculated. The non-clustered links are generally used for data forwarding and their bandwidth requirements are the amount of bandwidths necessary for the forwarding. For example, the bandwidth required by the link $R_1 \rightarrow B_0$ in FIG. 17 is equal to the sum of the bandwidths necessary for forwarding the data from the links $R_3 \rightarrow R_1$, $R_4 \rightarrow R_1$ and $P_1 \rightarrow R_1$.

In another example, in the case that the links are not clustered, the bandwidth requirement of each link may be calculated based on the information of bandwidth requirements of the related users, so as to obtain the information regarding traffic flows in the communication system.

In an example, when only a local area in the communication system changes and thus causes the traffic flows of the nodes in the local area to change, only the information regarding traffic flows in this local area needs to be re-collected.

It should be noted that, the above method of re-collecting the resource management information is merely illustrative, rather than exhaustive. The disclosure should not be considered as limited to this. The resource management information of the communication system may be collected by any other appropriate method or technique, the description of which is not detailed herein.

As an example, the collected resource management information of the communication system may be saved in the main control node (e.g. the base station in the primary system) of the communication system. As another example, the collected resource management information of the communication system may be saved in a distributed way in other nodes of the communication system, e.g. in one or more the relay stations or user nodes with a good calculation capability. Particularly, each of the relay stations or user nodes with a good calculation capability may save the resource management information of the local area to which it is located. The resource management information may be stored as required by using any appropriate technology, the description of which is not detailed herein.

Figure 5:
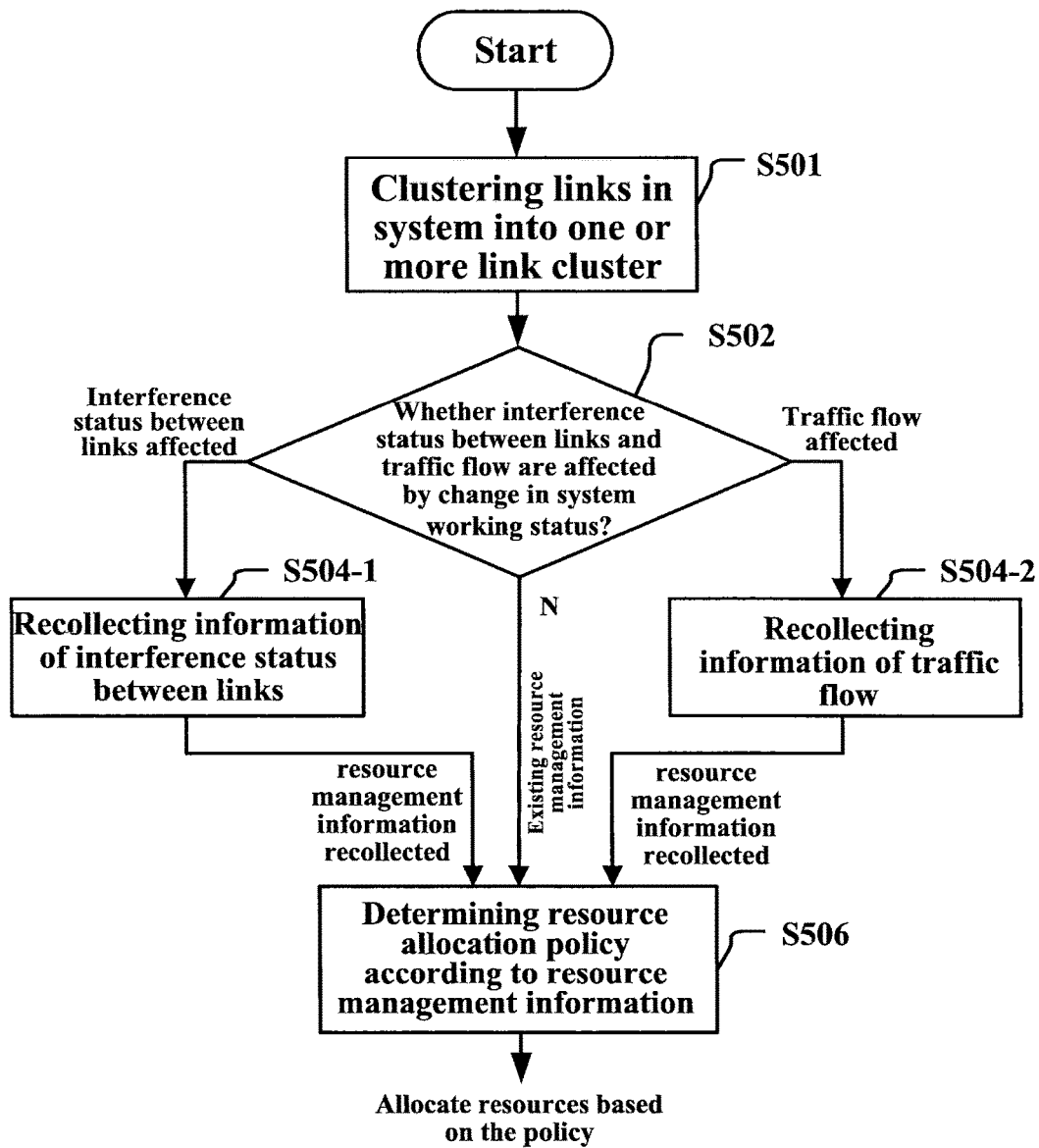
FIG. 5 is a schematic flowchart illustrating the resource management method according to another embodiment of the disclosure.

FIG. 5 is a schematic flowchart illustrating the resource management method according to another embodiment of the disclosure. The method of FIG. 5 is similar to that of FIG. 4. The difference lies in that the method of FIG. 5 further includes a step of clustering the radio links in the communication system.

As shown in FIG. 5, the resource management method includes steps S502, S504-1, S504-2 and S506, and further includes step S501.

In step S501, the links in the communication system are clustered, to obtain one or more link clusters. The following steps may be performed by using the link cluster as a unit. The links may be clustered by using the above method similar to the above examples or embodiments, the description of which is not repeated.

Steps S502, S504-1, S504-2 and S506 are similar to steps S402, S404-1, S404-2 and S406 in FIG. 4, the description of which is not repeated.

As a particular example, after the links are clustered, step S504-1 of re-collecting the information regarding the interference statuses between links may include: obtaining the information regarding the interference statuses between the link clusters and the information of interference statuses between links within each of the link clusters.

As another particular example, after the links are clustered, step S504-2 of re-collecting the information regarding traffic flows may include: obtaining the information regarding the traffic flows in each of the link clusters.

In addition, in the method of FIG. 5, link clustering step S501 is shown to be executed before step S502. In another example, the link clustering step may be executed after step S502 or at other appropriate time, the description of which is not detailed herein.

By using the link clustering, the working amount for re-collecting the resource management information may be reduced, thereby decreasing the load of the communication system.

Figure 6:
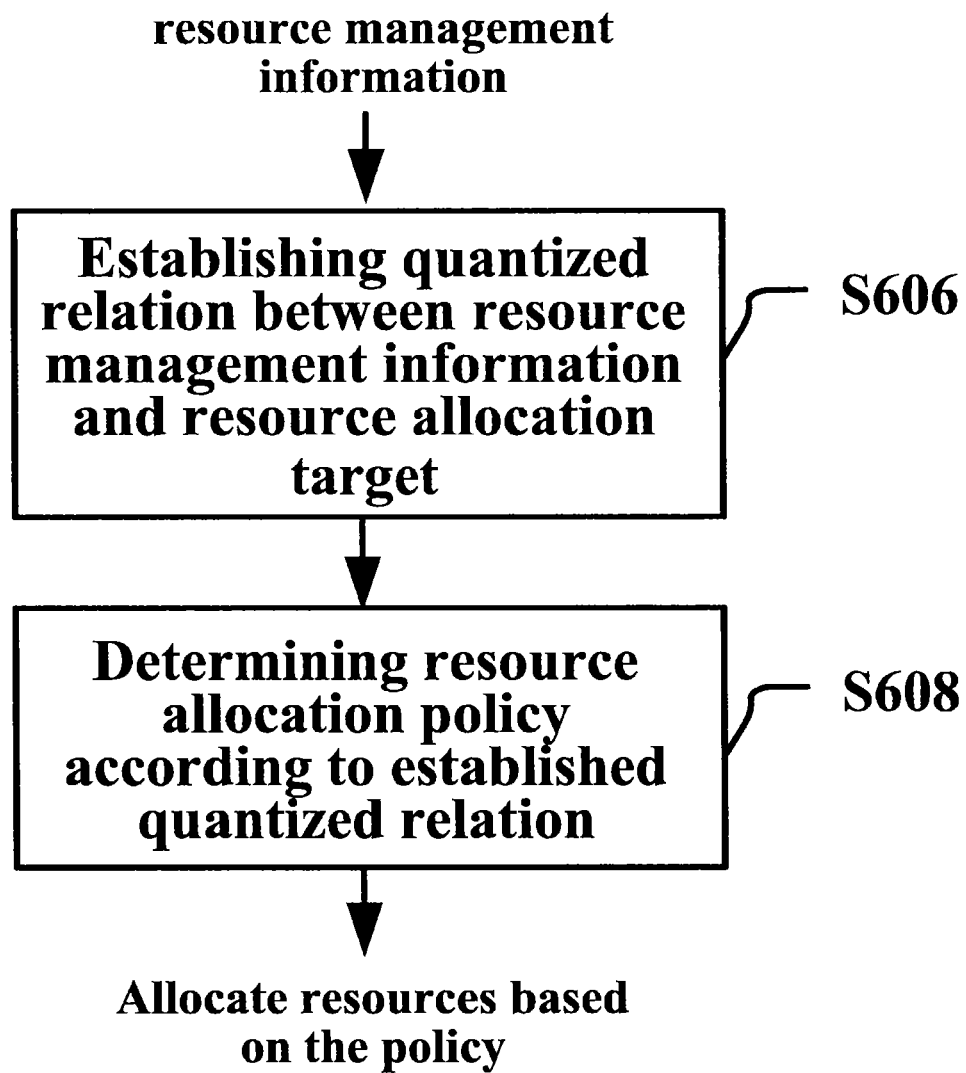
FIG. 6 is a schematic flowchart illustrating the method of determining a resource allocation policy in the communication system according to an embodiment of the disclosure.
Figure 7:
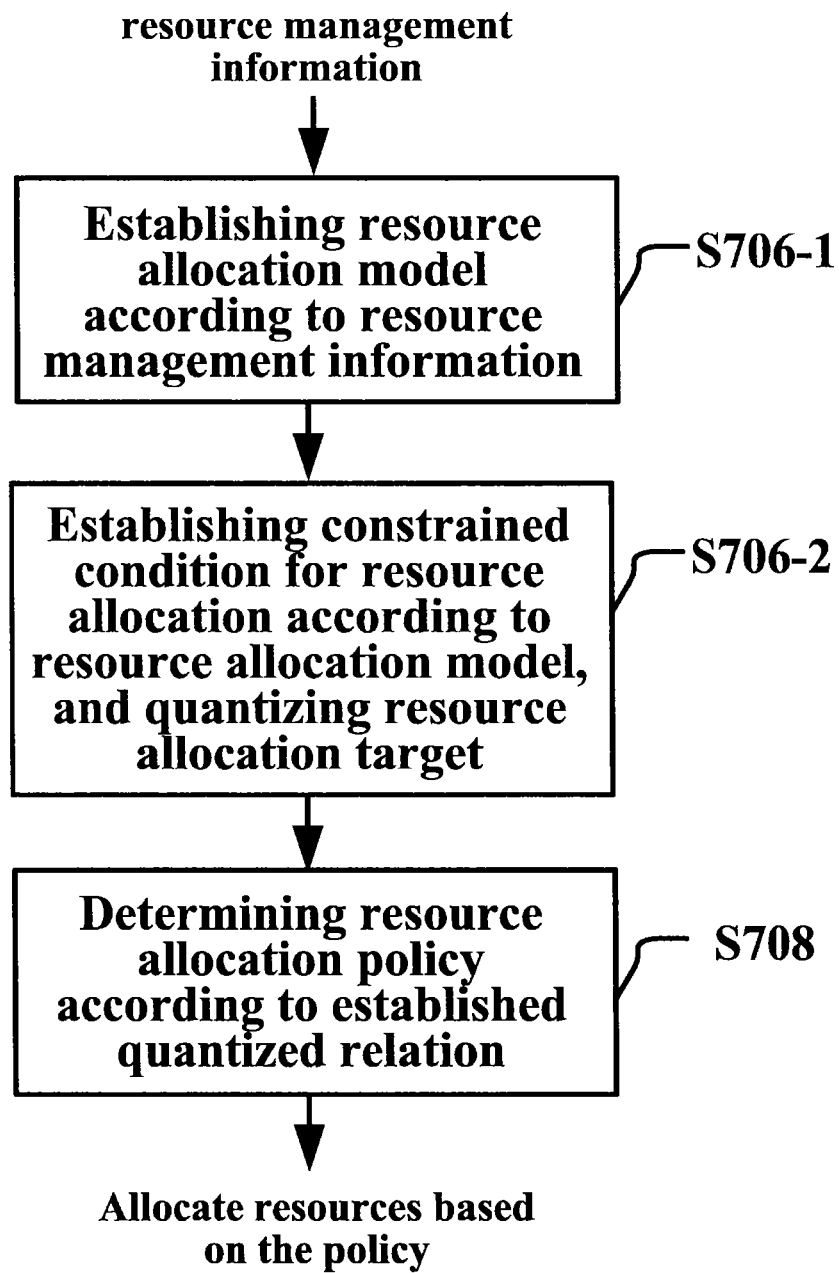
FIG. 7 is a schematic flowchart illustrating according to another embodiment of the disclosure the method of determining a resource allocation policy in the communication system.
Figure 8:
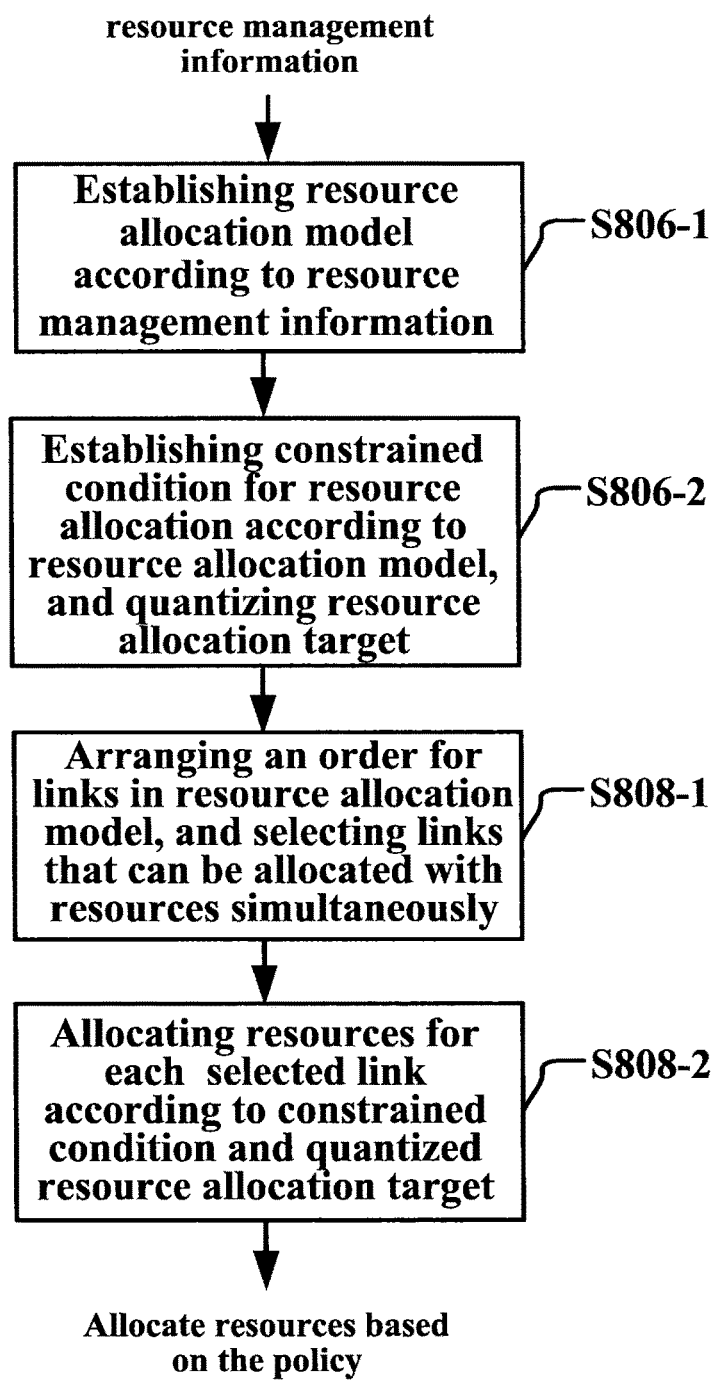
FIG. 8 is a schematic flowchart illustrating a method of determining a resource allocation policy in the communication system according to another embodiment of the disclosure.

FIG. 6, FIG. 7 and FIG. 8 are schematic flow charts showing the method of determining a resource allocation policy according to embodiments of the disclosure.

The method of FIG. 6, FIG. 7 or FIG. 8 may be used to determine the resource allocation policy of the communication system based on the resource management information of the communication system. The resource management information herein has the same meaning as described in the above embodiments and examples and may be collected by using any of the methods described above, the description of which is not repeated.

The method of FIG. 6 includes steps S606 and S608. Particularly, in step S606, the quantized relation between the resource management information and the resource allocation target of the communication system is established. In step S606, the resource allocation policy of the communication system is determined based on the quantized relation.

In the embodiment of FIG. 7, the step of establishing the quantized relation in FIG. 6 is refined. As shown in FIG. 7, the step of determining the resource allocation policy of the communication system based on the resource management information may include two sub-steps S706-1 and S706-2. In step S706-1, a resource allocation model may be created based on the resource management information. The resource allocation model may reflect the neighborhood relations between the links, mutual exclusion relations between the links, and bandwidth requirement and priority level of each link in the communication system, and the like. In step S706-2, the resource allocation constraint conditions are established based on the resource allocation model and the resource allocation target is quantized. Step S708 is similar to step S608 in FIG. 6, the description of which is not repeated.

In an example, before the step of determining the resource allocation policy of the communication system based on the resource management information, the method may further include a step of clustering the radio links the communication system, which is the same as the above embodiment, the description of which is not repeated. In the example, the resource allocation model established in step S706-1 may reflect the neighborhood relations between the links, mutual exclusion relations between the links, and bandwidth requirement and priority level of each link in the communication system, and the like. By using the link clustering, the complexity of computation in establishment of the resource allocation model may be reduced.

Figures 18A, 18B, 18C:
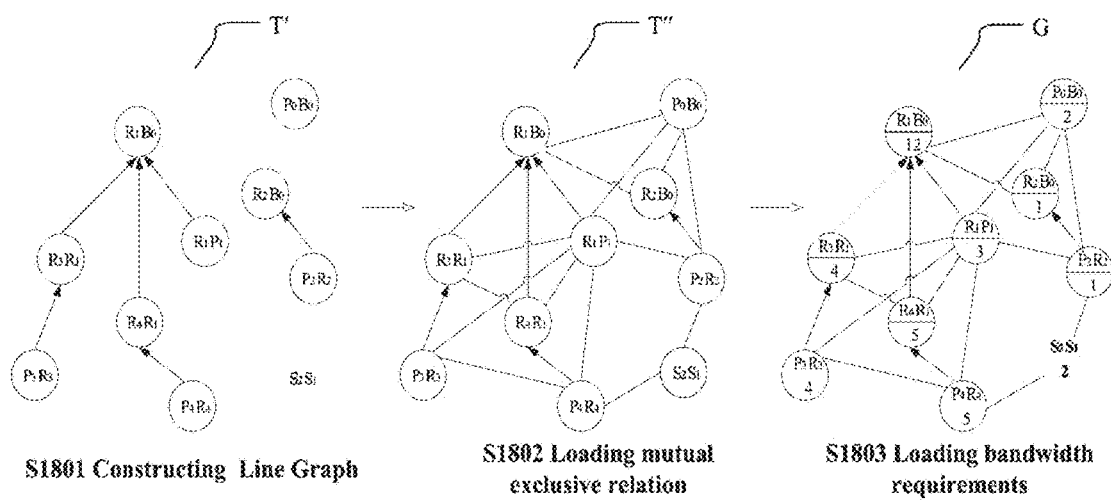
FIG. 18A shows a step in an example process of establishing a resource application model based on the resource management information by using the method of graph theory.
FIG. 18B shows a step in an example process of establishing a resource application model based on the resource management information by using the method of graph theory.
FIG. 18C shows a step in an example process of establishing a resource application model based on the resource management information by using the method of graph theory.

FIGS. 18A-C shows an example of the process of establishing the resource allocation model based on the resource management information by using the graph theory. As shown in FIGS. 18A-C, the process of establishing the resource allocation model of the communication system may include 3 steps S1801, S1802 and S1803.

In step S1801, a line graph is constructed based on the neighborhood relations between the links in the communication system. For conciseness, the network structure shown in FIG. 17 is used as an example. T denotes the graph shown in FIG. 17. FIG. 18A shows a line graph constructed based on the graph of FIG. 17, which is denoted by T'. As shown in FIG. 18A, the vertexes in T' correspond to the directional arcs (i.e. the radio links) in T. The arrow of an arc is directed to the head vertex, and at the other end of arc is the tail vertex of the arc. The links in the primary system network are denoted by hollow dots, and the links in the secondary system network are denoted by solid dots. Any two vertexes in T' are connected with an arc, if and only if the two vertexes correspond to two neighboring arcs (i.e. the head vertex of one of the two arcs is the tail vertex of the other one) in T, and the direction of an arc in T' is consistent with that of an arc in T to which the vertexes thereof correspond, and is used to represent the flow direction of the data. For example, the links $R_3 \rightarrow R_1$ and $R_1 \rightarrow B_0$ in FIG. 17 are converted into two vertexes $R_3R_1$ and $R_1B_0$ in FIG. 18A which are connected by an arc from $R_3R_1$ to $R_1B_0$.

In step S1802, the mutual exclusion relation between links is loaded. Any two vertexes in T' are connected by a non-directional edge, if and only if there are the $1^{st}$, $2^{nd}$ or $3^{rd}$ type of mutual exclusion relation between two arcs in T corresponding to the two vertexes, thus the graph T" shown in FIG. 18B is obtained.

In step S1803, the actual bandwidth requirements are loaded. The vertexes in T" are weighted, thus forming graph G in FIG. 18C. The weight of a vertex corresponds to the bandwidth requirement of the arc, corresponding to the vertex, in T, as shown by the values in the vertexes in FIG. 18C. If the actual bandwidth requirements values are not integers, they may be normalized as integers for the following operation.

Graph G may be called as a Hierarchically Weighted Mixed Graph. "Hierarchically" means that the vertexes in graph G has different priority levels. For example, in the example there are two priority levels, i.e. the primary system and the secondary system, which are denoted distinguishably by hollow dots and solid dots. "Weighted" means that the vertexes in graph G are weighted. "Mixed Graph" means that the vertexes in graph G are connected in two manners, i.e. by using directional arcs and non-directional edges.

By using the method, the resource allocation model of the communication system is established. Some examples of establishing the resource allocation constraint conditions and quantizing the resource allocation target based on the resource allocation model are described below.

By the above resource allocation model, i.e. graph G; the resource sharing and allocation of the communication system may be mapped as a problem of multicoloring graph G; which is also referred to as Hierarchically Weighted Mixed Graph Multicoloring (HWM²) problem.

For better understanding of the description, some terms and symbols are described first. "∈" denotes "belonging to", e.g., i, j∈N denotes i, j belong to the set N; "∃" denotes "exist", e.g., ∃i∈N denotes there is at least one element i which belongs to the set N; "∀" denotes "any", e. g., ∀I∈N denotes any element i in the set N. In the example, N denotes the set of natural numbers, [i . . . j] denotes a part of natural numbers {i, i+1, . . . , j}, wherein i, j∈N and i≤j. |X| denotes the Cardinality of the set X, i.e. the number of elements in the set. Graph G may denote a quaternion (V, A, E, ω), wherein, V denotes the set of vertexes, A denotes the set of arcs, E denotes the set of edges, and ω denotes the set of weight values. Based on the priority levels, the set V may be denoted by a vector $(V_1, V_2, \ldots, V_m)$, wherein $V_i$ denotes the set of vertexes having the ith priority level. i∈[1 . . . m], m denotes the number of priority levels of the vertexes. $\cup_{i\in[1 \ldots m]} V_i = V$ (That is, the combination of all $V_i$ is V), and if i≠j, $V_i \cap V_j = \phi$ (That is, when i≠j, the intersection of $V_i$ and $V_j$ is zero). The priority level of the vertexes of $V_i$ is higher than that of $V_j$, if and only if i<j. The priority level of vertex v may be denoted by r(v)∈[1 . . . m], i.e. v∈$V_{r(v)}$. If the tail vertex of an arc is u∈V and the head vertex is v∈V, the arc may be denoted as (u,v), u may also be called as the precedence vertex (of vertex v), v may also be called as descendance vertex (of vertex u). The set of all the precedence vertexes of the vertex v may be denoted by P(v)={u|u∈V, (u,v)∈A}. The edge connecting the vertexes u and v may be denoted by [u, v]. The weights of the vertex v∈V in the set V are denoted by $\omega_v$.

Generally, multicoloring Ψ of hierarchically weighted mixed graph G is a mapping from the set V of graph G to the Power Set $2^N$ of the set N, i.e. $\Psi: V \to 2^N$. The mapping allocates $|\Psi(v)|=\omega_v$ different numbers of colors to each vertex v∈V in the set V, and meets the following conditions: the sets of colors allocated to two vertexes connected by an edge disjoint, the sets of colors allocated to two vertexes connected by an arc meets the precedence constraint condition and the vertexes having different priority levels comply with the priority constraint condition. The minimum color allocated to the vertex v is denoted by $s_\Psi(v)=\min\{i/i\in\Psi(v)\}$, and the maximum color allocated to the vertex v is denoted by $f_\Psi(v)=\max\{i|i\in\Psi(v)\}$. The maximum color among the colors allocated to all the vertexes in the set V is denoted as $f_\Psi=\max\{f_\Psi(v)|v\in V\}$.

Like the set of natural numbers, the set of colors is an ordered set and the numbers of the colors correspond to the natural numbers. In the example, the color and the natural number have the same meaning and a color means a corresponding natural number. The coloring process is to allocate the colors in an ascending order. In multicoloring Ψ, the colors ζ∈N are allocated to the set of all vertexes, which is denoted by $\Gamma_\Psi(\zeta)=\{v|\zeta\in\Psi(v), v\in V\}$. It is supposed that a color allocated to v∈V is ζ∈Ψ(v), the set of vertexes which have a priority level higher than that of v and belong to the set $\Gamma_\Psi(\zeta)$ may be denoted by $\Lambda_\Psi(v,\zeta)\cup_{j\in[1 \ldots r(v)-1]} V_j \cap \Gamma_\Psi$ (ζ); and the set of vertexes which have a priority level higher than that of v but do not belong to the set $\Gamma_\Psi(\zeta)$ may be denoted by $\overline{\Lambda}_\Psi(v,\zeta)=\cup_{j\in[1 \ldots r(v)-1]} V_j - \Lambda_\Psi(\zeta)$.

HWM² (The resource sharing and allocation of the communication system) is classified and described below with respect to various constraint conditions and optimizing targets.

I. Establishment of Constraint Conditions

Based on the constraint conditions, HWM² may be classified in 2 aspects.

In one aspect, HWM² may be classified as two types, i.e. Non-preemptive and Preemptive. In non-preemptive HWM⁻², the colors allocated to any one vertex is consecutive, which, in the sense of resource allocation, means that the resource blocks allocated to a link is consecutive in the ordered set of resource blocks, or means that a machine node has to work continuously until the end of the task once it is scheduled in machine scheduling. In preemptive HWM², the colors allocated to any one vertex may be non-consecutive, which, in the sense of resource allocation, means that the resource blocks allocated to a link may be non-consecutive, or means that a machine node may pause its operation after being scheduled and may resume the operation after a while in machine scheduling.

In the other aspect, HWM² problem may be classified into two types including non-interleaving and interleaving. In non-interleaving HWM², the minimum color allocated to any one vertex is larger than the maximum color of its precedence vertex, which, in the sense of resource allocation, means that the resource blocks allocated to a link follow the resource blocks allocated to its precedence link within the ordered set of resource blocks, for example, in a relay network a link for relay forwarding can forward data only when it has received data from its precedence link; or means that a producing process can be started only when all the objects to be processed have been obtained from its precedence process in the pipeline scheduling since the tools or resources needed in the two neighboring processes may be the same. In interleaving HWM², among any top ε∈N available colors, the number of colors allocated to any one vertex is no lager than the sum of the numbers of colors allocated to all its precedence vertexes, which, in the sense of resource allocation, means that the number of resource blocks allocated to any one link among the top ε resource blocks in the ordered set of resource blocks is no lager than the sum of numbers of resource blocks of all its precedent links. For example, in the relay network the data forwarded at any time by a link responsible for forwarding can only be a sub-set of the data received from its precedent links; or means that a producing process may start operation once it has obtained all the objects to be processed from its precedent process in pipeline scheduling since the tools or resources used in the two processes do not conflict with each other.

Table 2 shows the HWM² problem classified in the above two aspects based on the constraint conditions:

TABLE 1

HWM² classified based on constraint conditions

|  | non-preemptive | preemptive |
| --- | --- | --- |
| non-interleaving | $HWM_{npni}^2$ | $HWM_{pni}^2$ |
| interleaving | — | $HWM_{pi}^2$ |

As can be seen from Table 2, HWM² problem may be classified into 3 types based on the above 3 types of constraint conditions.

The first type of HWM² may be called as nonpreemptive-noninterleaving HWM², i.e. HWM$_{npni}^2$ in Table 2.

The nonpreemptive-noninterleaving multicoloring HWM$_{npni}^2$ of hierarchically weighted mixed graph G may be denoted as $\Psi_{npni}: V \to 2^N$. $|\Psi_{npni}(v)|=\omega_v$ different colors may be allocated to each vertex $v \in V$ while the following conditions (1)-(4) are met:

$$\forall v \in V, f_{\Psi_{npni}}(v) = s_{\Psi_{npni}}(v) + (\omega_v - 1) \quad (1)$$

$$f_{\Psi_{npni}}(u) < s_{\Psi_{npni}}(v), \text{ if } (u,v) \in A \quad (2)$$

$$\Psi_{npni}(u) \cap \Psi_{npni}(v) = \phi, \text{ if } [u,v] \in E \quad (3)$$

$$\forall \zeta \in \Psi_{npni}(v), \forall u \in \overline{\Lambda}_{\Psi_{npni}}(v,\zeta), \exists w \in \Lambda_{\Psi_{npni}}(v,\zeta), (u,w) \in \Lambda, \text{ or } (w,u) \in \Lambda, \text{ or } [u,w] \in E \quad (4)$$

Condition (1) denotes that the maximum color $f_{\Psi_{npni}}(v)$ allocated to any vertex is equal to the sum of its minimum color $s_{\Psi_{npni}}(v)$ and the number $\omega_v$ of colors allocated to it minus 1. That is, the colors allocated to any vertex v is consecutive. Condition (2) denotes that the maximum color $f_{\Psi_{npni}}(u)$ allocated to the tail vertex u of arc A is less than the minimum color $s_{\Psi_{npni}}(v)$ allocated to the head vertex v of the arc A. That is, the coloring of any vertex v can not be started before the end of coloring of its precedence vertex u. Condition (3) denotes that the colors allocated to the vertexes v and u connected via an edge disjoint. Condition (4) denotes that the coloring of any vertex v can not be take precedence of the coloring of a vertex having a higher priority level.

The 2$^{nd}$ type of HWM² may be as called preemptive-noninterleaving HWM², i.e. HWM$_{pni}^2$ in Table 2.

The preemptive-non-interleaving multicoloring HWM$_{pni}^2$ in hierarchically weighted mixed graph G may be denoted as $\Psi_{pni}: V \to 2^N$. $|\Psi_{pni}(v)|=\omega_v$ different colors are allocated to each vertex and the following conditions (5)-(7) are met:

$$f_{\Psi_{pni}}(u) < s_{\Psi_{pni}}(v), \text{ if } (u,v) \in A \quad (5)$$

$$\Psi_{pni}(u) \cap \Psi_{pni}(v) = \phi, \text{ if } [u,v] \in E \quad (6)$$

$$\forall \zeta \in \Psi_{pni}(v), \forall u \in \overline{\Lambda}_{\Psi_{pni}}(v,\zeta), \exists w \in \Lambda_{\Psi_{pni}}(v,\zeta), (u,w) \in A, \text{ or } (w,u) \in A, \text{ or } [u,w] \in E \quad (7)$$

$f_{\Psi_{pni}}(u)$ denotes the maximum color allocated to vertex u, $s_{\Psi_{pni}}(v)$ denotes the minimum color allocated to vertex v. Condition (5) denotes that for the vertexes u and v connected via an arc A, the maximum color $f_{\Psi_{pni}}(u)$ allocated to the tail vertex u is less than the minimum color $s_{\Psi_{pni}}(v)$ allocated to the head vertex V. That is, the coloring of any vertex v can not be started before the end of the coloring of its precedence vertex u. Condition (6) denotes that the colors allocated to the vertexes v and u connected via an edge disjoint. Condition (7) denotes that the coloring of any vertex v can not be take precedence of the coloring of a vertex having a higher priority level.

The 3$^{rd}$ type of HWM² may be called as preemptive-interleaving HWM², i.e. HWM$_{pi}^2$ in Table 2.

The preemptive-interleaving multicoloring HWM$_{pi}^2$ in hierarchically weighted mixed graph G may be denoted as $\Psi_{pi}: V \to 2^N$. $|\Psi_{pi}(v)|=\omega_v$ different colors are allocated to each vertex $V \in V$ and the following conditions (8)-(11) are met:

$$\forall \epsilon \in N, |\Psi_{pi}(v) \cap [1 \ldots \epsilon]| \leq \Sigma_{u \in P(v)\neq 0} |\Psi_{pi}(u) \cap [1 \ldots \epsilon]| \quad (8)$$

$$\Psi_{pi}(u) \cap \Psi_{pi}(v) = \phi, \text{ if } (u,v) \in A \quad (9)$$

$$\Psi_{pi}(u) \cap \Psi_{pi}(v) = \phi, \text{ if } [u,v] \in E \quad (10)$$

$$\forall \zeta \in \Psi_{pi}(v), \forall u \in \overline{\Lambda}_{\Psi_{pi}}(v,\zeta), \exists w \in \Lambda_{\Psi_{pi}}(v,\zeta), (u,w) \in A, \text{ or } (w,u) \in A, \text{ or } [u,w] \in E \quad (11)$$

Condition (8) denotes that the number of colors allocated to any one vertex v among the top $\epsilon \in N$ available colors does not exceed the sum of numbers of colors allocated to all its precedence vertexes $u \in P(v)$. Condition (9) denotes the colors allocated to the vertexes v and u connected via an arc disjoint. Condition (10) denotes the colors allocated to the vertexes v and u connected via an edge disjoint. Condition (11) denotes that the coloring of any vertex v can not be take precedence of the coloring of a vertex having a higher priority level.

II. Quantization of Optimizing Target

The optimizing target of coloring generally is to color with the least number of colors. In the example, a function regarding the maximum color $f_\Psi(v)$ allocated to the vertex v in multicoloring $\Psi$ is designed. The function may be denoted as $\Theta_\Psi(G) = \Sigma_{v \in V} \beta_v \cdot f_\Psi(v)$, wherein $\beta_v$ denotes a coefficient. Depending upon the different optimizing targets, $\beta_v$ may be set differently. In other words, different values of $\beta_v$ reflects different optimizing targets. By setting different values of $\beta_v$, an optimizing target can be optimized.

3 examples of setting the coefficient $\beta_v$ based on the optimizing target.

In the first example, the coefficient $\beta_v$ is set by using formula (1-1):

$$\beta_v = \begin{cases} 1/|\Gamma_\Psi(f_\Psi)|, & f_\Psi \in \Psi(v) \\ 0, & \text{Others} \end{cases} \quad (1\text{-}1)$$

In the example, $\Theta_\Psi(G) = |\Gamma_\Psi(f_\Psi)| \cdot 1/|\Gamma_\Psi(f_\Psi)| \cdot f_\Psi = f_\Psi$. The function $\Theta_\Psi(G)$ obtains the minimum value of the optimizing target, that is, the least number of colors needed in multicoloring $\Psi$ of graph G The number of colors is called as Weighted Chromatic Number in multicoloring $\Psi$, and is denoted by $\chi_\Psi(G)$. The weighted chromatic numbers corresponding to the 3 types of multicoloring problems in Table 2 may be denoted as: $\chi_{\Psi_{npni}}(G)$, $\chi_{\Psi_{pni}}(G)$ and $\chi_{\Psi_{pi}}(G)$, respectively. The resource allocation scheme corresponding to the optimizing target can make the throughput of the system to be maximum. In other words, if the optimizing target of resource allocation of the communication system is to make the throughput of the system to be maximum, formula (1-1) may be used to set the coefficient $\beta_v$.

In the second example, formula (1-2) is used to set the coefficient $\beta_v$:

$$\beta_v = 1/|V|, v \in V \quad (1\text{-}2)$$

In the example, $\Theta_\Psi(G) = 1/|V| \cdot \Sigma_{v \in V} f_\Psi(v)$. The optimizing target is to make $\Theta_\Psi(G)$ minimum, that is, to obtain the minimum value of the average of the maximum colors allocated to all the vertexes in graph G The resource allocation scheme corresponding to the optimizing target can make the average delay of the links to be minimum. In other words, if the optimizing target of resource allocation of the communication system is to make the average delay of the links to be minimum, formal (1-2) may be used to set the coefficient $\beta_v$.

In the third example, formula (1-3) is used to set the coefficient $\beta_v$:

$$\beta_v = g(r(v)), v \in V = (1\text{-}3)$$

In formulae (1-3), g(*) denotes any function. In the example, the vertexes v having the same priority level have the same coefficient $\beta_v$. For example, for a given priority level i∈[1 . . . m], in the case that $$\beta_v = \begin{cases} 1/|\Gamma_\Psi(\max\{f_\Psi(v)\,|\,v \in V_i\})|, & r(v) = i, \\ 0, & r(v) \neq i, \end{cases}$$

the optimizing target is to make $\Theta_\Psi(G)$ minimum, i.e. to obtain the least number of total colors needed for completing the coloring of all the vertexes having the i th priority level. In the open spectrum access system of the relay network, when i=1, the optimizing target is to make the resources needed for completing the traffic of all the users in the primary system to be minimum.

In the above 3 examples, by setting different values for the coefficient $\beta_v$, the different optimizing target of resource allocation can be quantized. In other words, by using the methods, the optimizing target of resource allocation can be quantized based on the constraint conditions of resource allocation.

Some examples of establishing the constraint conditions of the resource allocation and quantizing the optimizing target of resource allocation based on the resource allocation model are described above. It should be noted that these examples are merely illustrative, rather than exhaustive. Therefore, the disclosure should not be considered as limited to these.

In addition, the hierarchically weighted mixed graph multicoloring method may be applied to the system resource sharing and management having multiple priority levels and similar constraint conditions. In addition to the system resource sharing and management in the communication system, the method may also be used in machine scheduling, such as the pipeline machine scheduling.

FIG. 8 shows the flow chart of a method of determining a resource allocation policy in the communication system according to another embodiment of the disclosure.

In the embodiment of FIG. 8, the step of determining the resource allocation policy of the communication system based on the established quantized relation is further refined. As shown in FIG. 8, the step of determining the resource allocation policy of the communication system based on the established quantized relation may include 2 sub-steps S808-1 and S808-2. In sub-step S808-1, the links in the resource allocation model are sorted, to select the links that can be allocated with resources at the same time. In sub-step S808-2, resources are allocated to each of the selected links based on the resource allocation constraint conditions and the quantized resource allocation target.

In an example, before the step of determining the resource allocation policy of the communication system based on the established quantized relation, the method may further include a step of clustering the radio links in the communication system, which is the same as the above embodiments or examples and the description of which is not repeated). In the example, the established resource allocation model may reflect the neighborhood relations between the links, the mutual exclusion relations between the links, and the bandwidth requirement and priority level of each link in the communication system. Step S808-1 may include: sorting the link clusters in the resource allocation model, to select link clusters to which resources can be allocated at the same time. Step S808-2 may include: allocating resources to each of the selected link clusters based on the resource allocation constraint conditions and the quantized resource allocation target. In addition, in the example, the process of determining the resource allocation policy of the communication system may further include a step of further allocating the resources for each link cluster to each link in the link cluster. By using link clustering, the complexity of the process of deciding the resource allocation policy is reduced.

Figure 19:
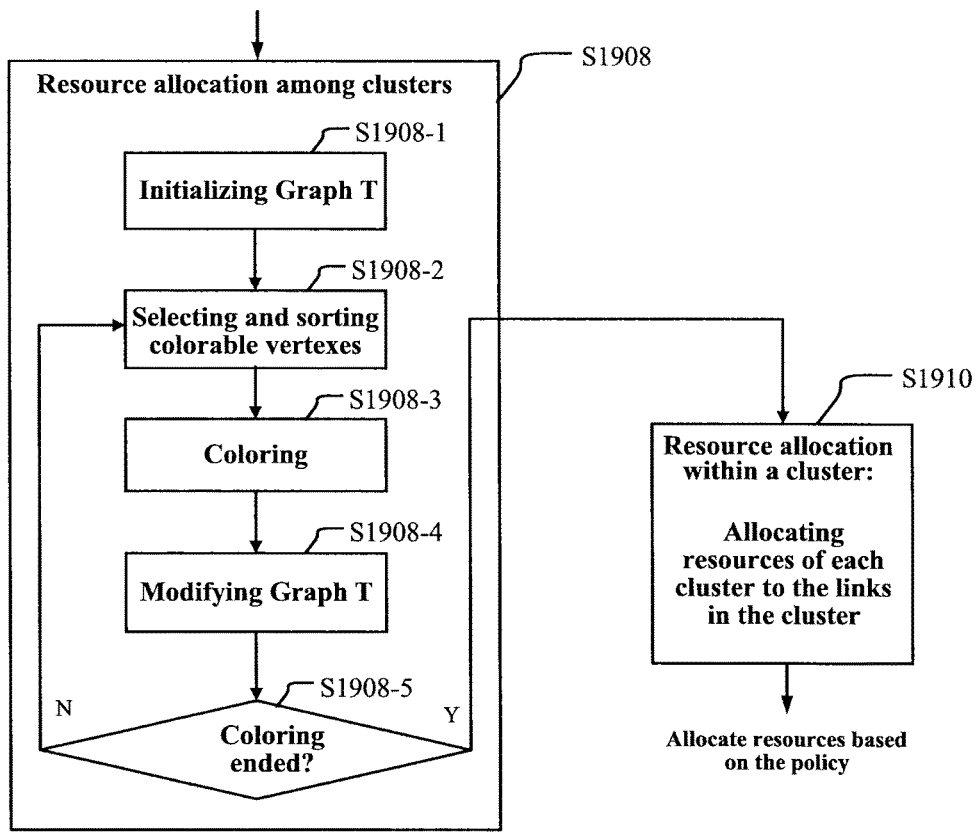
FIG. 19 shows an example of a flow of determining a resource allocation policy based on the quantized relation between the resource management information and the resource allocation target in the communication system.

FIG. 19 shows a particular example of determining the resource allocation policy of the communication system based on the quantized relation between the resource management information of the communication system and the resource allocation target.

As shown in FIG. 19, the method includes a step of resource allocation among clusters and a step of resource allocation within a cluster, i.e. steps S1908 and S1910 in FIG. 19.

In step S1908, the resource allocation among clusters is performed, in other words, to solve the HWM² problem. Since various optimizing targets in the problem are NP-hard problem (That is, an optimum solution can not be reached within polynomial time) and the resource allocation in the communication system (e.g. an open spectrum access system) needs to be performed repeatedly and frequently, some approximate algorithms may be employed to obtain the secondly optimum allocation policy, so as to balance between the system performance and the computation complexity. The example of FIG. 19 provides an approximate solving scheme. The steps in the method shown in FIG. 19 are described with graph T and graph G in FIG. 17 and FIGS. 18A-C as examples. The method in the example is suitable to the multicoloring based on the 3 types of constraint conditions in Table 2. The optimizing target is to obtain the weighted chromatic number. As shown in FIG. 19, the step of resource allocation among clusters includes 5 sub-steps.

In step S1908-1, graph T is initialized. In the initial status of the initialized graph T, compared with hierarchically weighted mixed graph G the difference lies only in that in graph T the weight of a vertex having a precedence vertex is 0. The vertexes in graph G are limited by each other. Therefore the vertexes in graph G are colored in a certain order. The vertexes in graph T comply with the condition "weight is not zero", which means that the vertex can be colored currently, i.e., resources can be allocated to the vertexes.

In step S1908-2, vertexes that can be colored are selected and the selected vertexes are sorted. Particularly, the vertexes that can be currently colored in graph T, i.e. the vertexes whose weights are not zero in graph T, are selected first. Then the selected vertexes that can be colored are sorted.

It should be noted that, the optimum solution of HWM² problem is obtained by coloring in order the vertexes selected from an ordered sequence by using each color, and the sorting target in the approximate solution is to make as many as vertexes obtain resources at the same time, so as to approach the optimum solution.

As an example, a possible rule of sorting the vertexes includes: (1) sorting vertexes having different priority levels in an order from high priority level to low priority level, (2) sorting the vertexes having the same priority level based on the lengths of the directional paths using the vertexes as destinations, in an order from large length from small length (the length of a directional path is the number of arcs in the path), (3) sorting the vertexes corresponding to the same directional path length based on the sum value of weights of vertexes on the directional path with the vertexes as start points, in an order from large from small, and (4) randomly sorting the remaining vertexes. Thus an ordered set of colorable vertexes is obtained, which may be denoted by Z.

In step S1908-3, the vertexes in the set of colorable vertexes are colored. Particularly, vertexes that can be colored at the same time are selected from the set, and colors are allocated to these vertexes. As an example, a possible method of selecting vertexes that can be colored at the same time includes: checking the vertexes in the set Z in order, to obtain a Maximal Independent Set, which may be denoted as U. In the maximal independent set U, any two vertexes are not connected via edge or arc. The value of color number n to be allocated at the same time ($1 \leq n \leq$ maximum value of weights of vertexes in maximal independent set U) will not affect the computation amount of the resource allocation. The larger the value of n is (That is the larger the number of colors to be allocated at the same time), the fewer the cycle number in the algorithm is, so that the computation amount is reduced. But the total number of colors finally allocated will increase.

In step S1908-4, the weight values of the vertexes in graph T are modified. Particularly, the number n of colors allocated to the vertex is subtracted from the weight of each vertex. If the total number of colors allocated to a vertex reaches the weight value of the vertex in graph G; the state of the vertex is labeled as colored.

In step S1908-5, it is determined whether all the vertexes in graph T have been labeled as colored. If yes, the coloring is ended. Otherwise, the process goes to step S1908-2 for a new cycle.

In step S1910, resource allocation within a cluster is performed.

Resources allocated to a cluster in step S1908 are further allocated to the links in the link cluster. If a cluster is an aggregation of multiple natural clusters, the natural clusters may be used as vertexes to form a new $HWM^2$ problem, which may be solved as descried above. If a cluster is a natural cluster or a sub-set of a natural cluster, any appropriate resource allocation method may be used to allocate resources in the cluster. For example the various resource allocation methods of communication networks having Point-to-Multipoint architecture may be used to allocate resources, the description of which is not detailed herein. In this way the resource amount allocated to each link in the communication system can be obtained.

Figure 9:
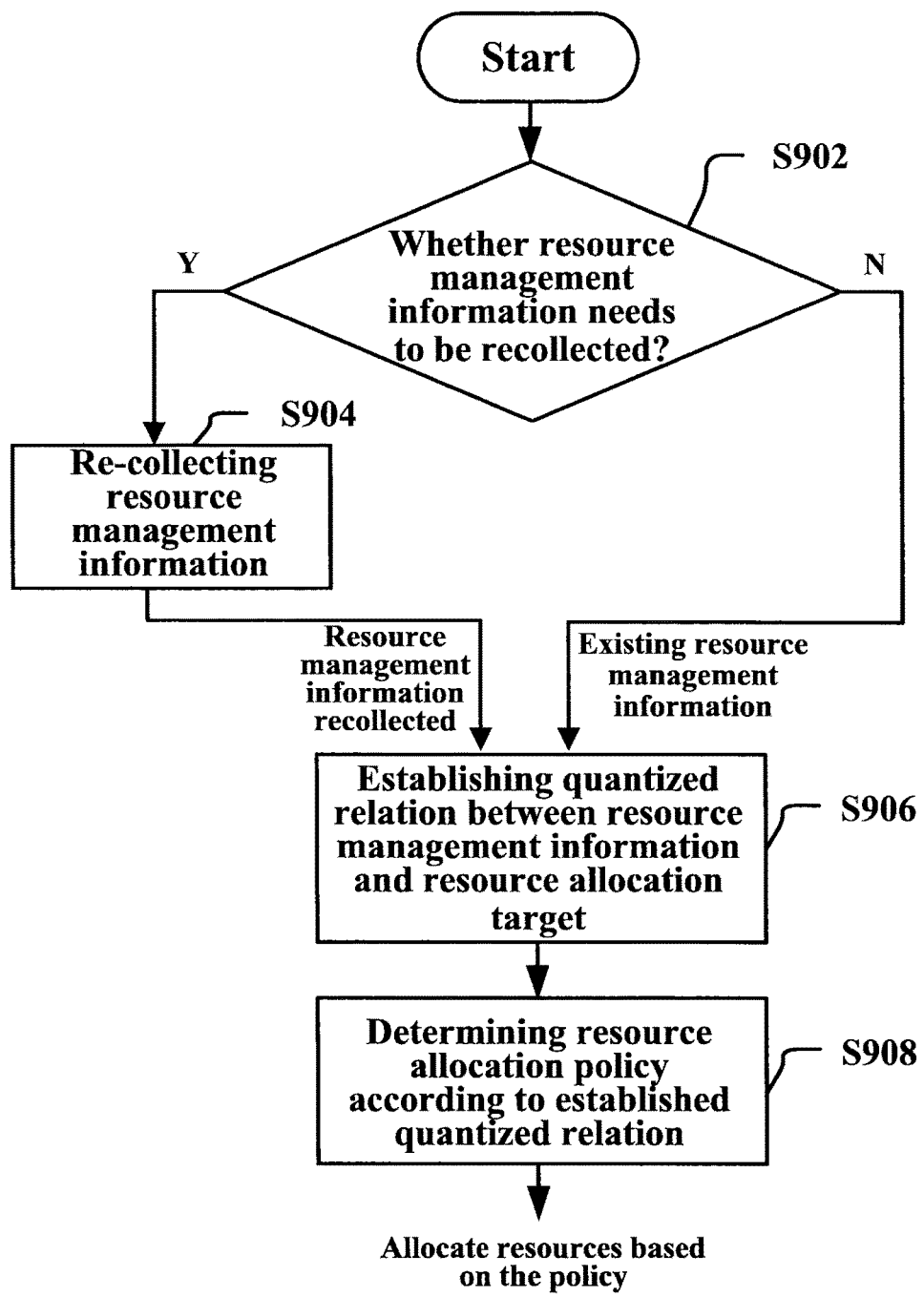
FIG. 9 is a schematic flowchart illustrating the resource management method according to another embodiment of the disclosure.

FIG. 9 is a schematic flowchart illustrating the resource management method according to an embodiment of the disclosure. The resource management method of FIG. 9 is based on the embodiment shown I FIG. 3, and uses the method of determining the resource allocation policy shown in FIGS. 6-8.

As shown in FIG. 9, the resource management method includes steps S902, S904, S906 and S908. Step S902 is similar to step S302 of FIG. 3 or step S402 in FIG. 4; step S904 is similar to step S304 in FIG. 3 or steps S404-1 and S404-2 in FIG. 4; step S906 is similar to step S806 in FIG. 6, or similar to steps S706-1 and S706-2, or similar to steps S806-1 and S806-2 in FIG. 8; and step S908 is similar to step S808 in FIG. 6, or step S708 in FIG. 7, or steps S808-1 and S808-2 in FIG. 8, the description of which is not repeated.

Figure 10:
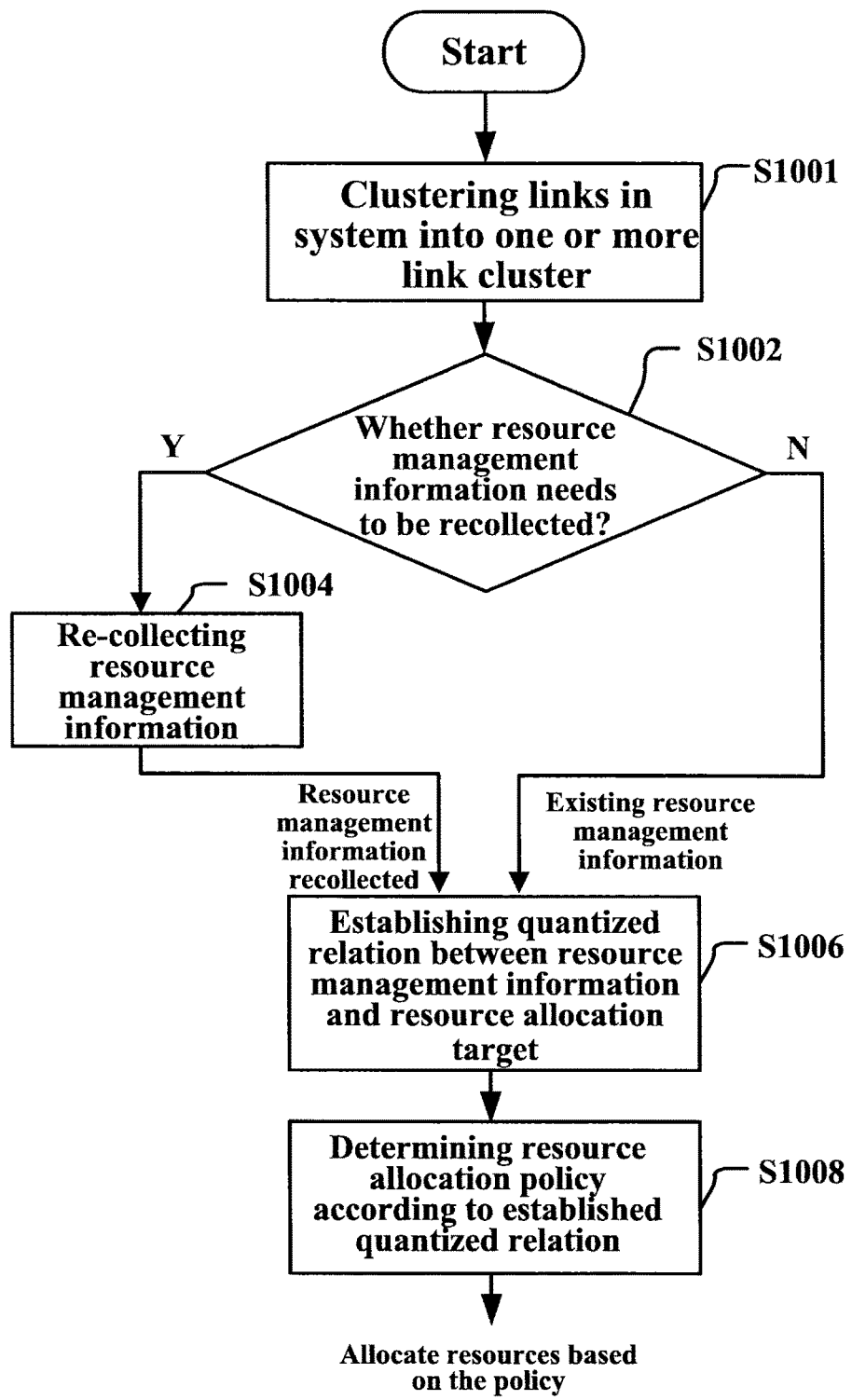
FIG. 10 is a schematic flowchart illustrating the resource management method according to another embodiment of the disclosure.

FIG. 10 is a schematic flowchart illustrating the resource management method according to another embodiment of the disclosure. The resource management method in FIG. 10 is similar to that in FIG. 9. The difference lies in that the method shown in FIG. 10 further includes a step of clustering the links.

As shown in FIG. 10, the resource management method includes steps S1001, S1002, S1004, S1006 and S1008. In step S1001, the radio links in the communication system are clustered to obtain one or more link clusters. By using the link clustering, the working amount in the process of collecting the resource management information may be reduced and the complexity of the process of deciding the resource allocation policy may also be decreased. The link clustering method in the above embodiments or examples may be used, the description of which is not repeated.

In addition, the link clustering step 1001 is not limited to be executed before step S1002. In another example, step 1001 may be executed at any appropriate time during the process of the resource management as required, such as before step S1004, or before step S1006 or the like, the description of which is not detailed herein.

Steps S1002, S1004, S1006 and S1008 are similar to steps S902, S904, S906 and S908 in FIG. 9, the description of which is not repeated.

Figure 11:
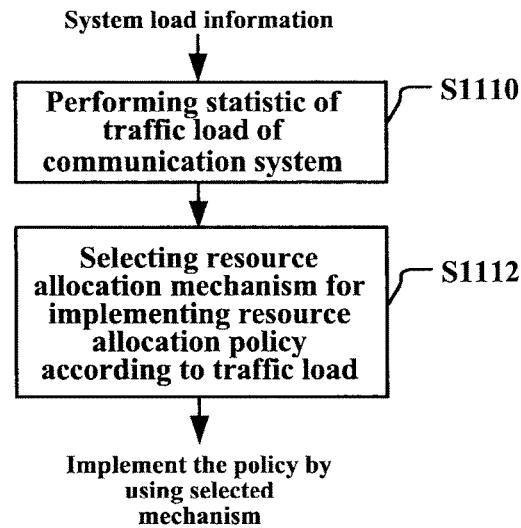
FIG. 11 is a schematic flowchart illustrating the method of selecting a resource allocation mechanism of the communication system according to an embodiment of the disclosure.

FIG. 11 is a schematic flow chart showing the method of selecting the resource allocation mechanism according to an embodiment of the disclosure. The resource allocation mechanism refers to the resource allocation is performed by which of the nodes in the communication system (e.g. an open spectrum access system). In the method of FIG. 11 the resource allocation mechanism of the communication system may be adjusted adaptively based on the variation in traffic load of the communication system.

As shown in FIG. 11, the method includes steps S1110 and S1112. In step S1110, a statistic of the traffic load of the communication system is performed. As an example, the load may be calculated based on the ratio between the average system throughput in a time period and the system capacity. Of course, the statistic of the load of the communication system may be performed by any other appropriate method, the description of which is not detailed herein. Then, in step S1112, the resource allocation mechanism for implementing the resource allocation policy is selected based on the statistic of the load. That is, it is determined to use which of the nodes in the communication system to perform the resource allocation policy of the communication system based on the load.

Figure 12:
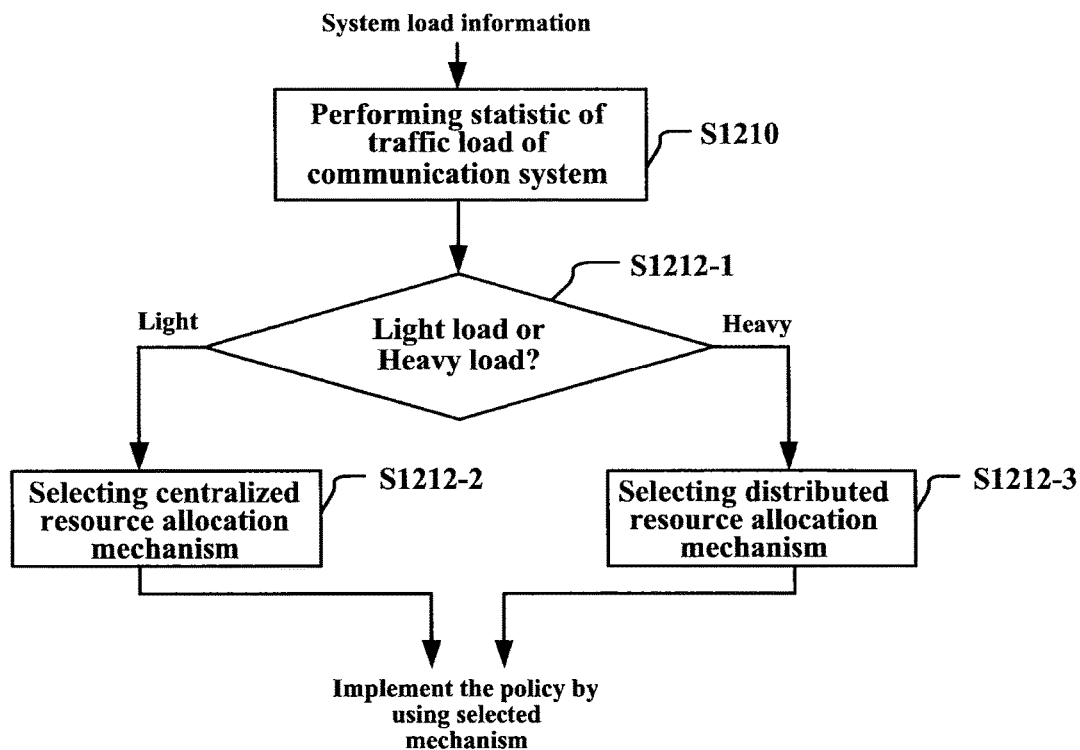
FIG. 12 is a schematic flowchart illustrating the method of selecting a resource allocation mechanism of the communication system according to another embodiment of the disclosure.

FIG. 12 shows an example of the method. As shown in FIG. 12, after the statistic of load of the communication system in step S1210, in step S1212-1 it is judged whether the communication system is in a light load status or a heavy load status based on the load. In the case of light load status, a centralized resource allocation mechanism is chosen in step S1212-2; and in the case of heavy load status, a distributed resource allocation mechanism is chosen in step S1212-3.

As an example, whether the communication system is in a light load status or a heavy load status may be determined by judging whether the statistic value of load is larger than a predetermined threshold value. For example, if the statistic value of load is larger than the threshold value, it may be determined that the communication system is in a heavy load status, otherwise, it is determined that the communication system is in a light load status. The threshold value may be set as required, the description of which is not detailed herein.

In the centralized resource allocation mechanism the main control node, e.g., the base station in the primary system network, in the communication system is used to allocate resources of the communication system in a centralized manner. In the resource allocation mechanism the resource management information and the optimizing target of resource allocation need to be reported to the base station and the base station decides the resource allocation policy, and issues the resource allocation result to the nodes in the communication system.

In the distributed resource allocation mechanism, multiple nodes in the communication system may be used as local deciding nodes. Each local deciding node allocates resources in the local area associated with it. Then, the main control node (e.g. the base station) coordinates the local deciding results to obtain the final resource allocation policy. For example, in the case that the communication system includes multiple system networks, the base station of the primary system network coordinates the local deciding results. In this mechanism, the resource management information of nodes of the local area is gathered into the local deciding node, and the local deciding node analyzes and quantizes the local information, to obtain a local allocation policy. The local allocation policies are gathered into the base station (or the base station of the primary system network) and are coordinated to obtain a global resource allocation policy of the communication system.

Different resource allocation mechanisms cause the functions of the nodes in the communication system to be different, thereby causing the differences in the types, amount, and objects of the transferred information. In this way the amounts, flows, and transmission times of the interaction information in the communication system are different. In the embodiment of FIGS. 10-11, the resource allocation mechanism may be selected adaptively based on the variation in load of the communication system. In this way, the computation and communication capability of the nodes may be sufficiently utilized and balance between the system performance and system cost may be reached, and the utilization rate of sources may be improved as much as possible. For example, if the load of the communication system is heavy, the load of the base station, which serves as the destination of all the data, of the primary system is very heavy. And at this time some nodes in the communication system are idle, and may be used to do local resource allocation deciding. Thus the computation load of the base station may be reduced and the information needed to be transmitted to the base station in the resource allocation becomes fewer. If the load of the communication system is light, all the resource management information may be gathered into the base station which determines a globally optimum deciding policy, so as to optimize the system performance.

The method of selecting the resource allocation mechanism shown in FIG. 11 and FIG. 12 may be applied to the resource management method in the above embodiments or examples.

Figure 13:
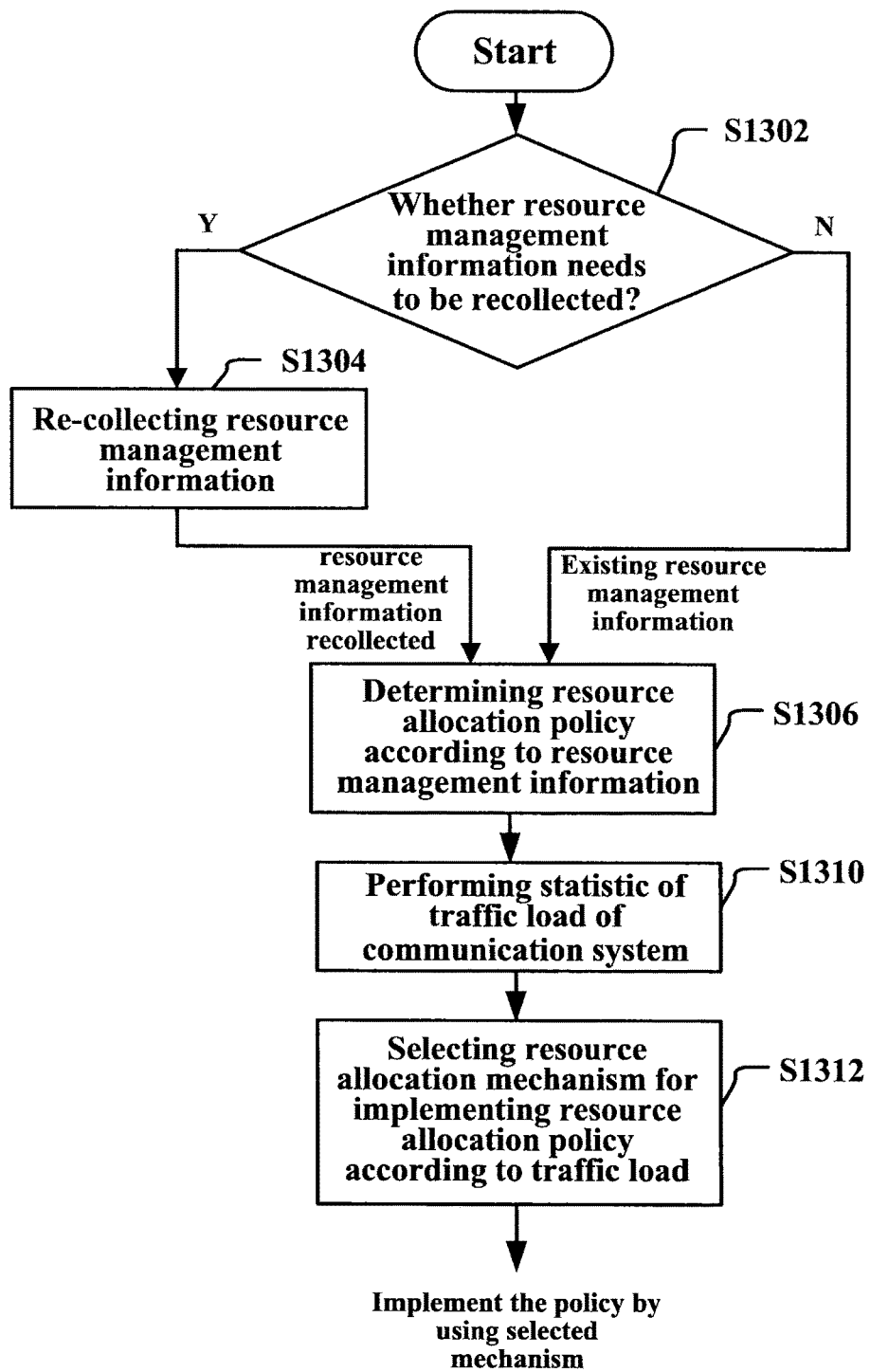
FIG. 13 is a schematic flowchart illustrating the resource management method according to another embodiment of the disclosure.

FIG. 13 shows an embodiment of the resource management method in which the method of selecting the resource allocation mechanism shown in FIG. 11 is used. As shown in FIG. 13, the resource management method includes steps S1302, S1304, S1306 and S1310, S1312. Step S1302, S1304, S1306 are similar to steps S302, S304 and S306 in FIG. 3, and steps S1310 and S1312 are similar to steps S1110 and S1112 in FIG. 11, the description of which is not repeated. In the embodiment, the information collection policy may be adjusted adaptively based on the degree of operating status variation of the communication system; in addition, the resource allocation mechanism suitable for the load may be selected based on the variation in load of the communication system. It should be noted that, the embodiment shown in FIG. 13 is merely illustrative, rather than exhaustive. For example, the steps shown in FIG. 11 and FIG. 12 may be performed after or before the steps in FIG. 4-FIG. 10 or executed during the process shown in FIG. 4-FIG. 10. For another example, the steps shown in FIG. 11 and FIG. 12 may be executed in parallel with the process of FIG. 3-FIG. 10, the description of which is not detailed herein.

In the above embodiments and examples the method of resource sharing and management in the communication system is described. The resource management method may be applied to the open spectrum access system, especially the communication system in which multiple networks co-exist. The above resource management method may be adjusted adaptively based on the variation in the system structure, such as the number/position/signal coverage/mobility of nodes (e.g. the relay station) in the primary system, the type/scale/number of the secondary systems, and the like. In the case that the resource requirements of users in the primary system are met, the resources are multiplexed as much as possible, to provide the users in the secondary system with chances of utilizing the resources, thereby improving the overall system's resource utilization rate.

Figure 20:
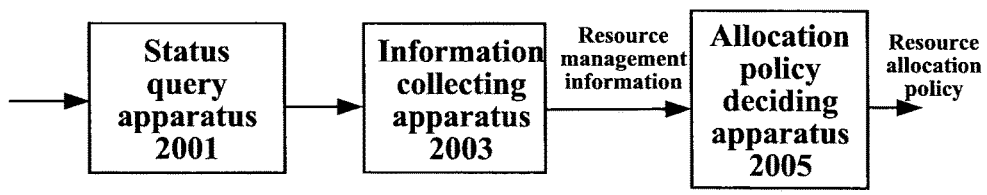
FIG. 20 is a schematic block diagram illustrating the resource management system according to an embodiment of the disclosure.

FIG. 20 shows the resource management system for resource sharing and management in the communication system according to an embodiment of the disclosure. Similar to the above embodiments and examples, the resources may include the time domain resources, the frequency domain resources, and the code domain resources and any combination thereof. The communication system may be a communication system needing a dynamic allocation and management for the resources, such as the communication system having the features of open spectrum access system (For example the systems shown in FIG. 1 and FIG. 2).

As shown in FIG. 20, the resource management system may include a status query apparatus 2001, an information collecting apparatus 2003 and an allocation policy deciding apparatus 2005.

The status query apparatus 2001 may judge whether the degree of operating status variation of the communication system causes resource management information of the communication system to change. In other words, the status query apparatus 2001 determines whether the resource management information of the communication system needs to be re-collected based on the degree of operating status variation of the communication system. If yes, the status query apparatus 2001 instructs the information collecting apparatus 2003 to re-collect the resource management information. Otherwise, the resource management information is not re-collected, while the previously collected or saved resource management information may be used.

Similar to the above embodiment or examples, the resource management information of the communication system refers to the information that is capable of affecting the management of resources and the deciding of allocation policy of the communication system, and includes but not limited to information regarding statuses of nodes, interference statuses between links and traffic flows in the communication system, and the like. Examples of the resource management information are provided above, the description of which is not repeated.

The information collecting apparatus 2003 may recollect the resource management information of the communication system based on the instruction of the status query apparatus 2001.

As an example, the collected resource management information may be stored in a storage device which may be provided in the resource management system or may be located in a node (e.g. the base station) of the communication system. As an example, the resource management information of the communication system may be saved in the main control node (e.g. the base station in the primary system) of the communication system. As another example, the resource management information may be distributedly saved in other nodes of the communication system, such as in one or more relay stations. Particularly, each relay station may save the management information of the associated local area in which the relay station is located. The resource management information may be saved as required by using any appropriate technology, the description of which is not detailed herein. The storage device may be any suitable record medium, including but not limited to a floppy disc, an optical disc, a magnetic-optical disc, a memory card, a memory stick, or the like, the description of which is not detailed herein.

The allocation policy deciding apparatus 2005 may determine the resource allocation policy of the communication system based on the resource management information.

During collection (e.g. analysis/statistic/measurement) of the information needed for the resource allocation, the resource management system of FIG. 20 may adjust the policy of collecting information adaptively based on the degree of operating status variation of the communication system, so that the system cost for information collection may be reduced effectively.

The status query apparatus 2001 may determine whether the degree of operating status variation of the communication system affects the information for resource management and deciding (That is, the resource management information whether needs to be re-collected) by using various appropriate methods.

As an example, if the operating status variation of the communication system relates to only a local area, only the resource management information associated with the local area needs to be re-collected, while the resource management information associated with other areas may remain as previously collected or saved information. As another example, if the variation of the communication system relates to only part of operating statuses thereof (e.g. interference status between links or statuses of traffic flows), only the information associated with this part of operating statuses is re-collected. For example, when a primary user node moves, the mutual exclusion relation between links connecting the node and other nodes is caused to change, while the traffic flows remain unchanged. In this case, only the information associated with the mutual exclusion relation between related links is re-collected, while the information of traffic flows related to this node may use the previously collected or saved information. For another example, when the traffic flow between a primary user node and other nodes changes while the interference relationship between the links remains unchanged, only the information of the traffic flows associated with the primary user node is re-collected, and the information of mutual exclusion relation between links associated with the primary user node needs not to be re-collected.

Figure 21:
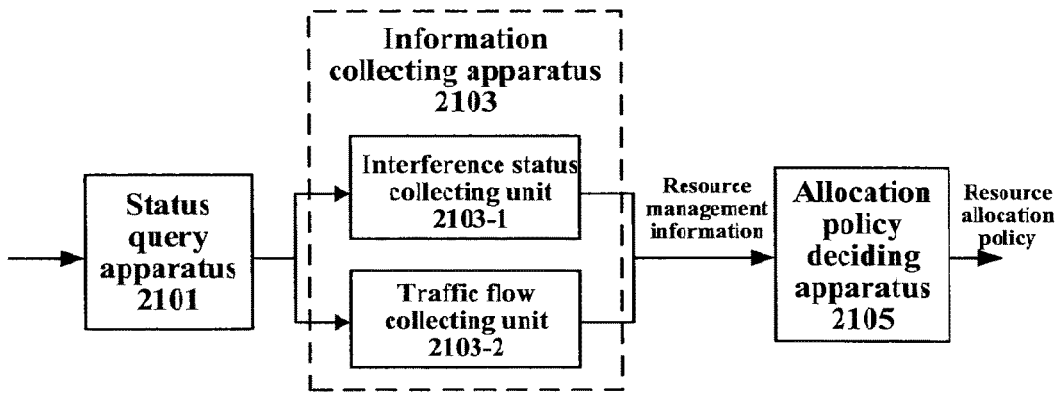
FIG. 21 is a schematic block diagram illustrating the resource management system according to another embodiment of the disclosure.

FIG. 21 shows the resource management system according to another embodiment of the disclosure.

The resource management system in FIG. 21 is similar to that of FIG. 20, that is, it includes a status query apparatus 2101, an information collecting apparatus 2103 and an allocation policy deciding apparatus 2105. The difference lies in that, the information collecting apparatus 2103 further includes an interference status collecting unit 2103-1 configured to collect information regarding the interference statuses between the links and a traffic flow collecting unit 2103-2 configured to collect information regarding the traffic flows. The status query apparatus 2101 is configured to judge whether the operating status variation of the communication system affects the interference statuses between the links in the communication system, and if yes, instruct the interference status collecting unit 2103-1 to re-collect information regarding the interference statuses between the links. The status query apparatus 2101 further judges whether the operating status variation of the communication system affects the traffic flows in the communication system, and if yes, instruct the traffic flow collecting unit 2103-2 to re-collect information regarding the traffic flows. If the operating status variation of the communication system does not affect the interference statuses between links in the communication system and the traffic flows of the communication system, the system management information needs not to be re-collected. In other words, in this case, the resource management information is not recollected, and the previously collected or saved resource management information may be used. The allocation policy deciding apparatus 2105 is similar to the allocation policy deciding apparatus 2005 in FIG. 20, the description of which is not repeated.

Similar to the resource management system in FIG. 20, the resource management system in FIG. 21 adaptively adjusts the policy of information collection based on the degree of operating status variation of the communication system during collection (e.g. analysis/statistic/measurement) of information needed for the resource allocation, so as to reduce the system cost of information collection effectively. Particularly, whether the resource management information needs to be re-collected and which resource management information needs to be re-collected may be determined according to the degree of variation in various operating statuses (e.g. changes in the mutual exclusion relation between links between some nodes and traffic flows of some nodes, and the like) in the areas of the communication system (In the example of FIG. 21 the information regarding the mutual exclusion relation between links is re-collected, or the information regarding traffic flows is recollected, or both are re-collected).

The information collecting apparatus 2003 or 2103 may collect the resource management information of the communication system by using any of the above described method, for example, in the embodiments or examples described with reference to FIG. 14-FIG. 16, the description of which is not repeated.

Figure 22:
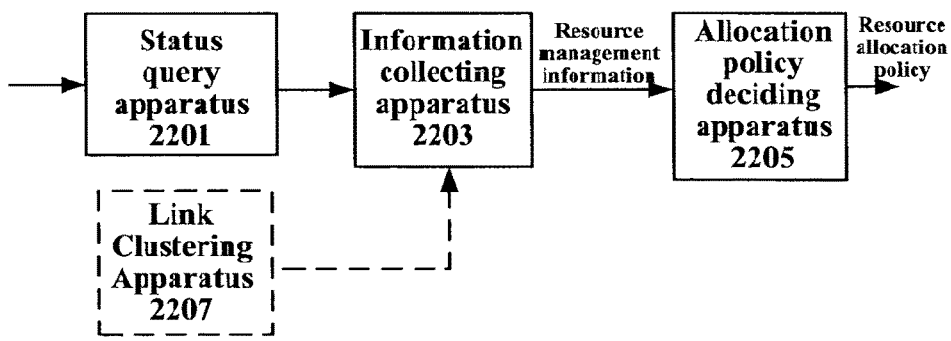
FIG. 22 is a schematic block diagram illustrating the resource management system according to another embodiment of the disclosure.

FIG. 22 shows the resource management system according to another embodiment of the disclosure. In the embodiment, before collecting the resource management information of the communication system, the links of the communication system are clustered.

As shown in FIG. 22, the resource management system includes a status query apparatus 2201, an information collecting apparatus 2203 and an allocation policy deciding apparatus 2205, and further includes a link clustering apparatus 2207.

The status query apparatus 2201, the information collecting apparatus 2203 and the allocation policy deciding apparatus 2205 are similar to those in FIG. 20 or 21.

The link clustering apparatus 2207 may cluster the links in the communication system into one or more link clusters. The link clustering apparatus 2207 may perform the clustering by using any of the methods described above, the description of which is not repeated. The information collecting apparatus 2203 may collect the resource management information based on the result of the clustering. Particularly, the information collecting apparatus 2203 may collect the resource management information by obtaining information regarding interference statuses between the link clusters, interference statuses between links within each link cluster and traffic flows of each link cluster.

As a particular example, after the link clustering apparatus 2207 clusters the links, the information collecting apparatus 2203 may collect the information regarding interference statuses by obtaining information regarding interference statuses between the link clusters, interference statuses between links within each link cluster and may recollect the information regarding traffic flows by obtaining and traffic flows of each link cluster. In addition, as an example, the allocation policy deciding apparatus 2205 may allocate resources to each link clusters first and then allocate the resources for each link cluster to the links within the link cluster during determination of the resource allocation policy based on the resource management information (For example, see the example shown in FIG. 19).

The resource management system in FIG. 22 clusters the links of the communication system, which can reduce the working amount for recollecting the resource management information and decrease the complexity of the deciding of the resource allocation policy, thereby reducing the system load.

Figure 23:
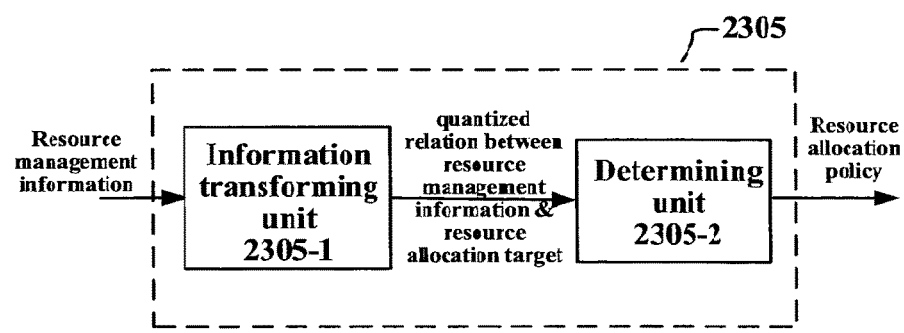
FIG. 23 is a schematic block diagram illustrating the allocation policy deciding apparatus according to an embodiment of the disclosure.

FIG. 23 shows an allocation policy deciding apparatus determining the resource allocation policy of the communication system based on the resource management information of the communication system according to an embodiment of the disclosure.

The allocation policy deciding apparatus 2305 of FIG. 23 includes an information transforming unit 2305-1 and a determining unit 2305-2. The information transforming unit 2305-1 may establish a quantized relation between the resource management information and a resource allocation target, and the determining unit 2305-2 may determine the resource allocation policy according to the established quantized relation. As a particular example, the information transforming unit 2305-1 may establish the quantized relation by: establishing a resource allocation model according to the resource management information first and establishing a constrained condition for resource allocation according to the resource allocation model and quantizing the resource allocation target. Similar to the above embodiment or examples, the resource allocation model reflects neighborhood relations between the links, mutual exclusion relations between the links, and bandwidth requirement and priority level of each link in the communication system, and the like. The information transforming unit 2305-1 may establish the resource allocation model of the communication system by using the above described method, such as the method described with reference to FIG. 7 and FIGS. 18A-C, and may establish various constraint conditions and quantize the resource allocation target by using the above described method, such as the method described with reference to the hierarchically weighted mixed graph multicoloring, the description of which is not repeated.

As another particular example, the determining unit 2305-2 may determine the resource allocation policy by: arranging an order for links in the resource allocation model, selecting links that can be allocated with resources simultaneously therein and allocating resources for each of the selected links according to the constrained condition for resource allocation and the quantized resource allocation target. The determining unit 2305-2 may determine the resource allocation policy by using the above described method, such as the method described with reference to FIG. 8 and FIG. 19, the description of which is not repeated.

Figure 24:
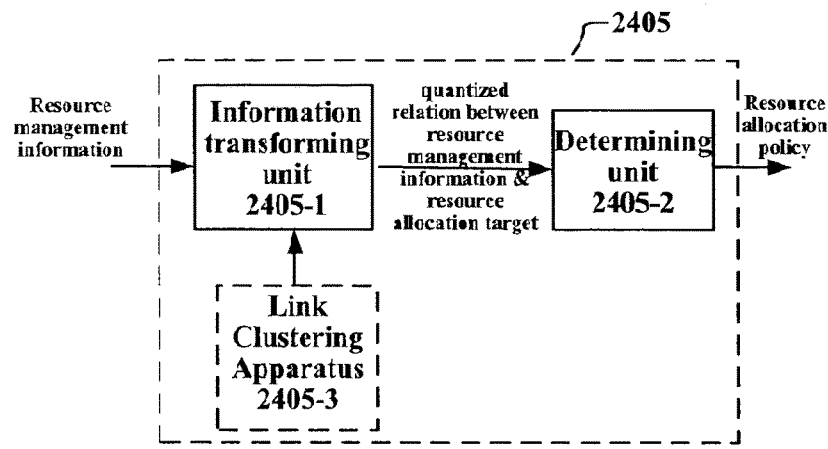
FIG. 24 is a schematic block diagram illustrating the allocation policy deciding apparatus according to another embodiment of the disclosure.

FIG. 24 shows the allocation policy deciding apparatus 2405 according to another embodiment of the disclosure. Similar to the allocation policy deciding apparatus 2305 in FIG. 23, the allocation policy deciding apparatus 2405 in FIG. 24 includes an information transforming unit 2405-1 and a determining unit 2405-2. The difference lies in that, the allocation policy deciding apparatus 2405 in FIG. 24 further includes a link clustering apparatus 2405-3. The link clustering apparatus 2405-3 may cluster the links in the communication system into one or more link clusters. The link clustering apparatus 2405-3 may perform the clustering by using the above described method, the description of which is not repeated. With the links of the communication system being clustered, the resource allocation model established by the information transforming unit 2405-1 reflects neighborhood relations between the link clusters, mutual exclusion relations between the link clusters, and bandwidth requirement and priority level of each link cluster in the communication system, and the like. The determining unit 2405-2 may arrange an order for link clusters in the resource allocation model, select link clusters that can be allocated with resources simultaneously therein; and allocate resources for each of the selected link clusters according to the constrained condition for resource allocation and the quantized resource allocation target. The determining unit 2405-2 may further allocate the resources allocated to each link cluster to links within the each link cluster. As can be seen, by the link clustering, the complexity of the deciding process of the resource allocation policy can be reduced.

The allocation policy deciding apparatus 230 or 2405 in FIG. 23 or 24 may be applied to the above resource management system, such as the resource management systems described with reference to FIG. 20-FIG. 22), the description of which is not detailed herein.

Figure 25:
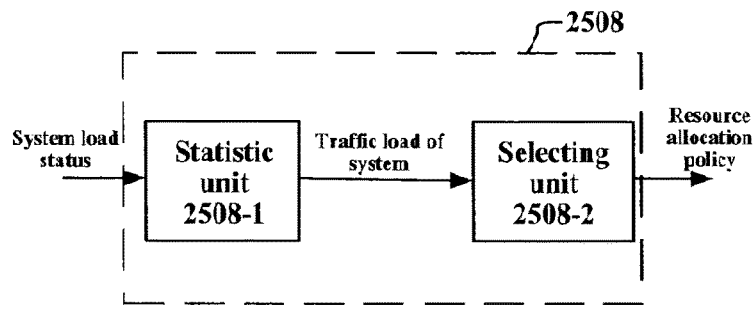
FIG. 25 is a schematic block diagram illustrating the allocation mechanism controlling apparatus according to an embodiment of the disclosure.

FIG. 25 shows the allocation mechanism controlling apparatus 2508 which determines the resource allocation mechanism of the communication system according to an embodiment of the disclosure. Similar to the above embodiment or examples, the resource allocation mechanism refers to which nodes in the communication system (e.g. the open spectrum access system) are used for the resource allocation. The allocation mechanism controlling apparatus 2508 of FIG. 25 may adaptively adjust the resource allocation mechanism of the communication system based on the variation in load of the communication system.

As shown in FIG. 25, the allocation mechanism controlling apparatus 2508 includes a statistic unit 2508-1 and a selecting unit 2508-2. The statistic unit 2508-1 is configured to perform a statistic of traffic load of the communication system, and the selecting unit 2508-2 is configured to select a resource allocation mechanism for implementing the resource allocation policy according to the traffic load. Similar to the above embodiment or examples, the load may be calculated based on the ratio between the average system throughput in a time period and the system capacity. Of course, the statistic unit 2508-1 may perform the statistic of the load of the communication system by any other appropriate method, the description of which is not detailed herein.

In an example, the selecting unit 2508-2 is further configured to judge whether the communication system is in a light-load status or a heavy-load status according to the traffic load. In the case of the light-load status, the selecting unit 2508-2 selects a centralized resource allocation mechanism as the resource allocation mechanism of the communication system. In the case of the heavy-load status, the selecting unit 2508-2 selects a distributed resource allocation mechanism as the resource allocation mechanism of the communication system. As a particular example, the selecting unit may judge whether the communication system is in a light-load status or a heavy-load status by determining whether the traffic load is larger than a predetermined threshold value. For example, if the load is larger than the threshold value, the selecting unit may determine that the communication system is in heavy load, otherwise, in light load. The threshold value may be set as required, and is not limited to any particular value herein.

The centralized resource allocation mechanism and the distributed resource allocation mechanism have been described above, the description of which is not repeated.

Figure 26:
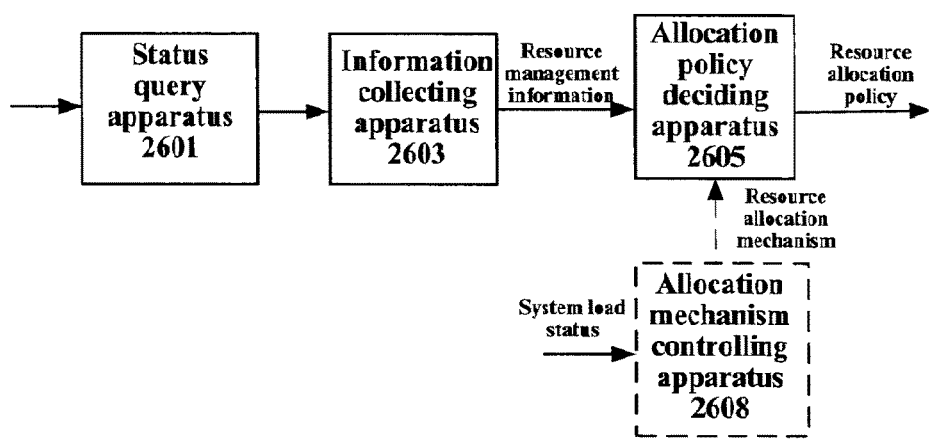
FIG. 26 is a schematic block diagram illustrating the resource management system according to another embodiment of the disclosure.

The allocation mechanism controlling apparatus of FIG. 25 may be applied to the resource management systems shown in FIG. 20-FIG. 22. FIG. 26 shows an example of the resource management system including the allocation mechanism controlling apparatus. As shown in FIG. 26, the resource management system includes a status query apparatus 2601, an information collecting apparatus 2603 and an allocation policy deciding apparatus 2605, and further includes an allocation mechanism controlling apparatus 2608. The allocation mechanism controlling apparatus 2608 is similar to the apparatus 2508 shown in FIG. 25, the status query apparatus 2601, the information collecting apparatus 2603 and the allocation policy deciding apparatus 2605 are similar to the corresponding apparatuses shown in FIG. 20, the description of which is not repeated. After selecting the resource allocation mechanism of the communication system, the allocation mechanism controlling apparatus 2608 may feed back the resource allocation mechanism to the allocation policy deciding apparatus 2605, so that the communication system may allocate resources by using the resource allocation policy determined by the allocation policy deciding apparatus 2605 based on the resource allocation mechanism.

Figure 27:
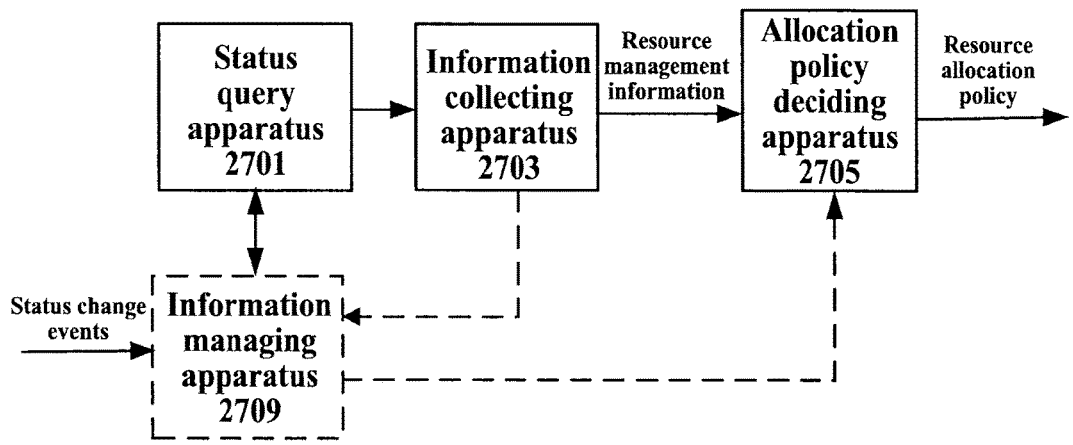
FIG. 27 is a schematic block diagram illustrating the resource management system according to another embodiment of the disclosure.

FIG. 27 shows the resource management system according to another embodiment of the disclosure. Similar to the embodiment of FIG. 20, the resource management system in FIG. 27 includes a status query apparatus 2701, an information collecting apparatus 2703 and an allocation policy deciding apparatus 2705. The difference lies int that the resource management system of FIG. 7 may further include include an information managing apparatus 2709.

The status query apparatus 2701, the information collecting apparatus 2703 and the allocation policy deciding apparatus 2705 are similar to the corresponding apparatuses of FIG. 20, the description of which is not repeated.

The information managing apparatus 2709 is configured to manage and save the operating statuses of the communication system. The information managing apparatus 2709 may be driven by various events of status changes, such as the moving of the relay station RS, the change of coverage dued to change in power of the relay station RS, or entering or leaving of a user, or the like, in the communication system, and update the corresponding status information according to the changes. The status query apparatus 2701 may query the information managing apparatus 2709 to determine the degree of operating status variation of the communication system, thereby determining whether the resource management information needs to be re-collected and determining the information of which operating statuses regarding which area in the system needs to be collected. As an example, when the information managing apparatus 2709 detects the change in the interference statuses between links or in traffic flows of the communication system, it may notify the status query apparatus 2701 by for example transmitting a control signal. For example, when detecting the change in the interference statuses between links or in traffic flows of the communication system, the information managing apparatus 2709 may change the corresponding status bits in the control signal to be transmitted to the status query apparatus 2701, so as to notify the change to the status query apparatus 2701. For example, when the change in the operating statuses of the communication system may affect the interference conditions between links, the bit for interference measurement status in the control signal may be set as 1 (True); and when the change in the operating statuses of the communication system cause the change in traffic flows, the bit for traffic flow statistic status may be set as 1 (True). As another example, the status query apparatus 2701 may send a request to the information managing apparatus 2709 (For example by transmitting the above control signal) and the information managing apparatus 2709 may feed back the change to the status query apparatus 2701. As another example, the status query apparatus 2701 may read from the information managing apparatus 2709 the information regarding the change in the operating statuses of the communication system. For example, the interference measurement status or the traffic flow statistic status may be saved the information managing apparatus 2709 and may be updated by the information managing apparatus 2709 continuously. The status query apparatus 2701 may obtain the degree of change in the operating statuses of the communication system by reading these statuses.

Figure 28:
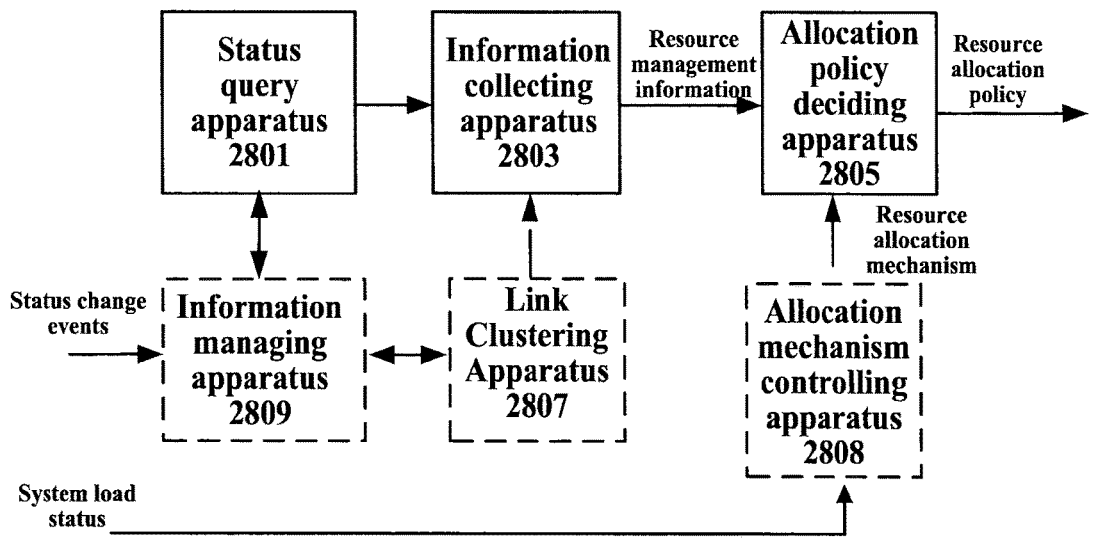
FIG. 28 is a schematic block diagram illustrating the resource management system according to another embodiment of the disclosure.

FIG. 28 shows the resource management system according to another embodiment of the disclosure. Similar to the embodiment in FIG. 27, the resource management system of FIG. 28 includes a status query apparatus 2801, an information collecting apparatus 2803, an allocation policy deciding apparatus 2805 and an information managing apparatus 2809. The difference lies in that the resource management system in FIG. 28 may further include a link clustering apparatus 2807 and an allocation mechanism controlling apparatus 2808.

The status query apparatus 2801, the information collecting apparatus 2803, the allocation policy deciding apparatus 2805 and the information managing apparatus 2809 are similar to the corresponding apparatuses in FIG. 27, the description of which is not repeated.

The link clustering apparatus 2807 is similar to the link clustering apparatus 2207 in FIG. 22, and the allocation mechanism controlling apparatus 2808 is similar to the allocation mechanism controlling apparatus 2508 or 2608 shown in FIG. 25 or 26, the description of which is not repeated.

Figure 29:
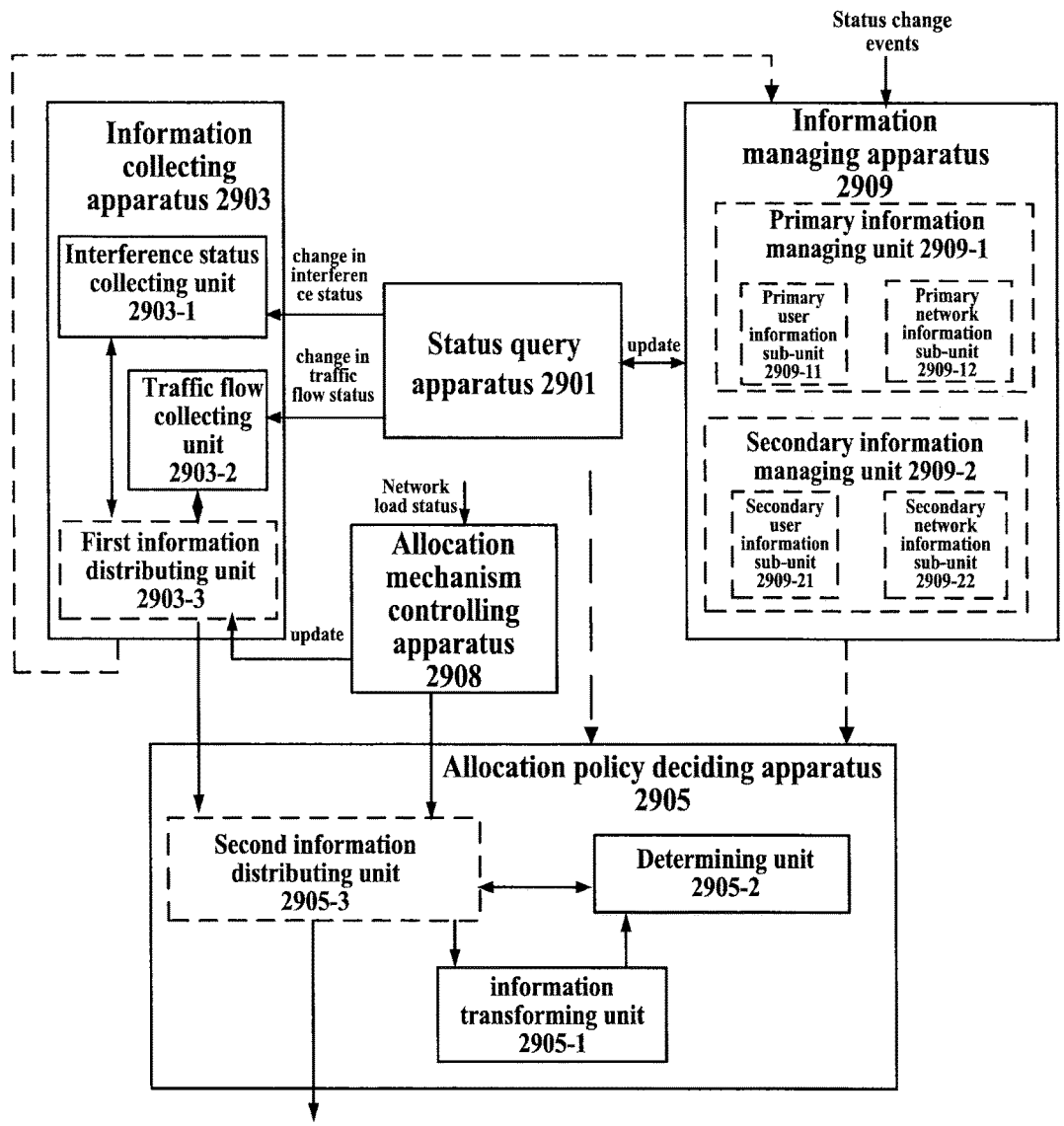
FIG. 29 is a schematic block diagram illustrating the resource management system according to another embodiment of the disclosure.

FIG. 29 shows a particular example of the resource management system for resource sharing and management in the communication system.

The resource management system in FIG. 29 includes a status query apparatus 2901, an information collecting apparatus 2903, an allocation policy deciding apparatus 2905, an information managing apparatus 2909, and an allocation mechanism controlling apparatus 2908.

The communication system in this example is an open spectrum access system, for example, a communication system including a primary system network and at least one secondary system network. The resource management information of such communication system includes but not limited to the statuses of the nodes in the primary system network and the secondary system network, the interference statuses between links and traffic flows, etc. The information managing apparatus 2909 may include a primary information managing unit 2909-1 for storing the resource management information of the primary system network and may further include a secondary information managing unit 2909-2 for storing the resource management information of the secondary system network. The example of the resource management information has been described above, the description of which is not repeated. As a particular example, the primary information managing unit 2909-1 may include a primary user information sub-unit 2909-11 for storing the information related to the primary users in the primary system network (e.g. as shown in Table 1) and a primary network information sub-unit 2909-12 for storing the information regarding the primary system network (e.g. as shown in Table 1). As another particular example, the secondary information managing unit 2909-2 may include a secondary user information sub-unit 2909-21 for storing the information regarding the secondary users in the secondary system network (e.g. as shown in Table 1) and a secondary network information sub-unit 2909-22 for storing the information regarding the secondary system network (e.g. as shown in Table 1). The units or sub-units may be driven by various events of status changes (such as the moving of the relay station RS, the change in coverage due to change in power of the relay station RS, or the entering and leaving of the primary or secondary user, or the like) of the communication system and update the status information based on the changes.

The status query apparatus 2901 may query the information managing apparatus 2909 to obtain whether the operating statuses of the communication system change since the last query, to determine whether the resource management information needs to be re-collected. The status query apparatus 2901 may obtain the information regarding the status change of the communication system from the information managing apparatus 2909 by using the above described method, the description of which is not repeated.

The information collecting apparatus 2903 includes an interference status collecting unit 2903-1 and a traffic flow collecting unit 2903-2. The units 2903-1 and 2903-2 are similar to those in FIG. 21, the description of which is not repeated. If the status query apparatus 2901 determines that the resource management information needs to be re-collected, it may send an actuating signal to the information collecting apparatus 2903, to actuate the units to collect information. For example, if the interference statuses between links of the communication system change, the interference status collecting unit 2903-1 is actuated; and if the traffic flow statues of the communication system change, the traffic flow collecting unit 2903-2 is actuated. The information collecting apparatus 2903 may further include a first information distributing sub-unit 2903-3. The first information distributing sub-unit 2903-3 may perform information interaction with other apparatuses in the resource management system. For example, The first information distributing sub-unit 2903-3 may transmit the information collected by the units 2903-1 and 2903-2 to the information managing apparatus 2909 and the allocation policy deciding apparatus 2905, and the like, and may receive information from the allocation mechanism controlling apparatus 2908.

If the status query apparatus 2901 determines that the resource management information needs not to be re-collected, it may instructs the allocation policy deciding apparatus 2905 to use the resource management information obtained in the last query to determine the resource allocation policy. As an example, the resource management information obtained in the last query may be saved in the information managing apparatus 2909.

The allocation policy deciding apparatus 2905 includes an information transforming unit 2905-1 and a determining unit 2905-2. The units 2905-1 and 2905-2 are similar to those in FIG. 23 or 24, the description of which is not repeated. The allocation policy deciding apparatus 2905 may further include a second information distributing sub-unit 2905-3. The second information distributing sub-unit 2905-3 may perform information interaction with other apparatuses in the resource management system, for example, it may receive information from the information collecting apparatus 2903 and/or the information managing apparatus 2909 and/or the status query apparatus 2901 and may obtain from the allocation mechanism controlling apparatus 2908 the information regarding the traffic load and the resource allocation mechanism, and may further transmit the determined resource allocation policy, for example, to a corresponding policy implementing device (not shown).

The policy implementing device firstly converts the number of resources allocated to each link to the actual radio resources (e.g. time domain resources, frequency domain resources, code domain resources or any combination thereof), and then form information packets of the resource allocation policy with reference to the resources needed for management of the communication system (e.g. the resources needed for user information interaction in the communication system), and issue the information packets. For the primary system network, the information issuing may be performed by carrying the information in frames; and for the secondary system network, the information issuing may be performed by information interaction of the primary system/the secondary system. Then, the nodes in the primary/secondary system network may transmit data via the allocated radio resources. As an example. the policy implementing device may be configured in the main control node (such as the base station or the base station in the primary system network) in the communication system.

The allocation mechanism controlling apparatus 2908 is similar to the apparatus 2508 or 2608 in FIG. 25 or 26.

The allocation mechanism controlling apparatus 2908 may adaptively change the content of information interaction based on the change in load status of the communication system in operation. By controlling the operations of the distributing units in the apparatuses, a flexible resource allocation mechanism of open spectrum access system may be formed, and thus the computation and communication capability of the nodes in the system may be utilized effectively. In this way the system performance may be improved. For example, in the centralized resource allocation mechanism (also referred to as center-controlled resource allocation mechanism), the base station of the primary system network may perform the resource management and deciding in a centralized manner. This needs the second information distributing unit to gather the information of resource allocation and the optimizing target obtained by the information transforming apparatuses to the base station. Once the base station decides the resource allocation policy, the second information distributing unit sends the policy to the nodes. In the distributed resource allocation mechanism, part of nodes in the resource management system is used as local deciding nodes for processing the resource management and deciding in the local areas. The base station of the primary system network coordinates the results of local deciding and obtain the resource allocation policy. In the distributed resource allocation mechanism, the results of collecting the resource management information of the nodes are gathered into the local deciding node of the local area and the local deciding node performs conversion and calculation on the local information to obtain a local deciding result. These local deciding results are gathered in the base station of the primary system network, to obtain a global resource allocation result which is issued to the nodes by the information distributing units.

Similar to the apparatus 2508 in FIG. 25, the allocation mechanism controlling apparatus 2908 may include a statistic unit and a selecting unit (not shown). The statistic unit performs a statistic of the load statuses of the communication system. In the case of light load, the selecting unit selects the centralized resource allocation mechanism; and in the case of heavy load, the selecting unit selects the distributed resource allocation mechanism. As an example, the load may be calculated based on the ratio between the average system throughput in a time period and the system capacity. If the load exceeds a threshold value, it may be determined that the communication system has heavy load, otherwise, it may be determined that the communication system has light load. As described above the threshold value may be set as required and should not be limited to any particular value.

In the case that the centralized resource allocation mechanism is selected, the selecting unit may further determine the types, amount, objects, and transmission times of the information to be interacted. For example, the information regarding the resource allocation and the optimizing target obtained by the information transforming apparatus may be gathered in the base station. Once the base station decides the resource allocation policy, it may be issued to the nodes by the second information distributing unit.

In the case that the distributed resource allocation mechanism is selected, the nodes in the communication system need to be classified based on the functions, to select the local policy deciding nodes. The local policy deciding nodes may be selected by the base station of the primary system network. For example, the local policy deciding nodes may be selected based on the computation capabilities, position distribution and communication conditions of the nodes. As an example, if the primary system network is a relay network, the relay stations may be chosen, or the routers, access points (APs) or user nodes having a good computation capability may be chosen. After selecting the local policy deciding nodes, the selecting unit may further determine the types, amount, objects and transmission times of the interaction information. As an example, it is supposed that the information of 100 nodes in the communication system needs to be collected. In this case, in distributed resource allocation mechanism, 10 local policy deciding nodes may be chosen. At this time, each local policy deciding node is in charge of the information collection and allocation policy deciding of 10 nodes in average. If 5 local policy deciding nodes are chosen, each local policy deciding node is in charge of the information collection and allocation policy deciding of 20 nodes in average. The local policy deciding nodes can gather the collected information to obtain a local resource allocation model, and send to the central deciding node (e.g. the base station) to decide the resource allocation policy. Or, the local policy deciding nodes may decide the local resource allocation policies based on the collected local information and send the local deciding results to the central deciding node which coordinates the local deciding results. Therefore, the selecting unit may determine the types, amount, objects and transmission times of the interaction information based on the number of local policy deciding nodes, the distribution thereof in the communication system, the local area served by each local policy deciding node as well as the functions thereof, the description of which is not detailed.

The information interaction between apparatuses in the resource management system and between the nodes of the communication system also occupies the system resources. Therefore, resources need to be allocated for these. As an example, the interaction information may be considered as system information, and may be implemented by allocating specific fields in the frame structures. As another example, the interaction information may be considered as data information, and may be allocated with resources together with the users. As another example, after the resource allocation policy for the nodes is determined, resource blocks may be allocated for the interaction information based on the requirements on resources and opportunities of the interaction. The resource allocation may be done by the allocation mechanism controlling apparatus.

The allocation mechanism controlling apparatus may drive the information distributing units to update the contents of interaction information. For example, the information distributing units may be actuated to update the confirmations, such as types, amount, objects and allocated resources, etc. of next (or next stage of) interaction information.

The above embodiments and examples are merely illustrative. It should be noted that the disclosure should not be considered as limited to these.

As an example, the steps in the above resource management method and the apparatuses, components and/or units in the above resource management system may be implemented as software, hardware, firmware or any combination thereof in the main node (for example the base station) of the communication system, and may be configured a as part of the resource management equipment of the base station. The way of configuring the apparatuses, components and/or units in the above resource management system by using software, hardware, firmware or any combination thereof is known in the art and is not detailed herein. As another example, the resource management method and/or system according to embodiments of the disclosure may be implemented in the resource management equipment of an existing base station, with a modification to the components of the resource management equipment of the existing base station.

As another example, the resource management system may be distributed. For example, the information managing apparatus may be configured in the base station, or may be distributed among the base station and local policy deciding nodes. For another example, the information transforming unit may be implemented in the base station, or may be distributed among the base station and local policy deciding nodes. The information obtained by the local policy deciding nodes is gathered in the base station. For another example, the allocation policy deciding apparatus may be implemented in the base station, or may be distributed among the base station and local policy deciding nodes. The local policy deciding nodes determine the local policies and send them to the base station. The allocation policy deciding apparatus in the base station determines the global policy. For another example, the status query apparatus or the information collecting apparatus may be implemented in the base station or in other nodes. In summary, the resource management system and method of the disclosure may be adaptively adjusted based on the actual conditions of the communication system, so that the capability of the nodes in the communication system may be fully utilized. The resource requirements of the primary users are ensured to be met, while providing resource utilization opportunity to the secondary user as much as possible. In this way, the resource utilization rate of the whole system is improved.

The present disclosure further provides a program product having machine-readable instruction codes which, when being executed, may carry out the methods according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

In the above description, the expressions such as "first", and "second" are used. It should be noted that these expressions are merely used to distinguish the terms literally, and should not be considered as representing an order thereof or other limitation.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separatively. That is, the executing orders described above should not be regarded as limiting the method thereto. In addition, it should be noted that the steps or apparatuses, components or units in the above embodiments or examples may be combined, unified or cancelled as required without departing from the scope of the disclosure. In other words, the disclosure is not limited to the above. For example, the link clustering step S501 in FIG. 5 may be applied to the embodiment shown in FIG. 3. More particularly, before step S302 or S304 in FIG. 3, the method may further include a link clustering step which is similar to step S501, to cluster the links in the communication system. In this way, the resource management information may be obtained by acquiring the interference relations between link clusters, the interference relations between links in each link cluster and information of traffic flows in each of the link clusters. As another example, the link clustering step S501 in FIG. 5 may be applied to the embodiment shown FIG. 6-8 to reduce the computation amount of the deciding process of the resource allocation policy, the description of which is not detailed.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

What is claimed is:

1. A spectrum sensing device which used in a communication system, the communication system comprising a primary system network and at least one secondary system network, the primary system network having a higher priority than the secondary system network for using at least one communication resource, the at least one communication resource sharable with the secondary system network, and the secondary system network sharing said communication resource when the primary system network is not interfered, the spectrum sensing device configured to:
   measure resource management information including at least one of incumbent signals and interference signals,
   report the measured resource management information,
   before the measurement, receive measurement requests from a geo-location function device, and
   after the measurement, report to the geo-location function device.

2. The device according to claim 1, wherein resource management information in the communication system includes information of changes of a variation degree of communication system operation statues.

3. The device according to claim 1, wherein
   nodes in the communication system, which measure resource management information can be chosen as a spectrum sensing device.

4. The device according to claim 1, wherein the geo-location function device is configured to:
   use a measurements result of the resource management information obtained from the spectrum sensing device to estimate interference level, and
   consider the interference level estimation to calculate an allowable maximum output power level.

5. The device according to claim 1, the spectrum sensing device further configured to:
   measure the resource management information from the primary system network and a primary user.

6. The device according to claim 1, the spectrum sensing device further configured to:
   measure the resource management information from the secondary system network and a secondary user.

7. The device according to claim 1, the spectrum sensing device further configured to:
   manage a coexistence function of the primary system network and the at least one secondary system network based on the measured resource management information.

8. The device according to claim 1, the spectrum sensing device further configured to:
   include geo-location information with the resource management information.

9. The device according to claim 1, the spectrum sensing device configured to:
   process the measured resource management information in the communication system in a neighborhood, and
   access a channel quality due to a presence of another device or system in the neighborhood.

* * * * *